(12) United States Patent
Jung et al.

(10) Patent No.: US 11,948,074 B2
(45) Date of Patent: Apr. 2, 2024

(54) METHOD AND APPARATUS WITH NEURAL NETWORK PARAMETER QUANTIZATION

(71) Applicant: SAMSUNG ELECTRONICS CO., LTD., Suwon-si (KR)

(72) Inventors: Sangil Jung, Suwon-si (KR); Changyong Son, Anyang-si (KR); Seohyung Lee, Seoul (KR); Jinwoo Son, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1224 days.

(21) Appl. No.: 16/398,710

(22) Filed: Apr. 30, 2019

(65) Prior Publication Data

US 2019/0347550 A1 Nov. 14, 2019

Related U.S. Application Data

(60) Provisional application No. 62/677,348, filed on May 29, 2018, provisional application No. 62/671,105, filed on May 14, 2018.

(30) Foreign Application Priority Data

Sep. 12, 2018 (KR) .................. 10-2018-0109197

(51) Int. Cl.
*G06N 3/08* (2023.01)
*B25J 9/16* (2006.01)
(Continued)

(52) U.S. Cl.
CPC .............. *G06N 3/08* (2013.01); *B25J 9/161* (2013.01); *B25J 9/163* (2013.01); *G06N 3/04* (2013.01); *G06V 40/00* (2022.01)

(58) Field of Classification Search
CPC .. G06N 3/08; G06N 3/04; G06V 40/00; B25J 9/161; B25J 9/163
See application file for complete search history.

(56) References Cited

U.S. PATENT DOCUMENTS 10,438,131 B1 * 10/2019 Pennington ............ G06N 7/005
2017/0076195 A1 * 3/2017 Yang .................... G06N 3/0454
(Continued)

FOREIGN PATENT DOCUMENTS

KR   10-2018-0013674 A     2/2018
WO   WO-2018071546 A1 *    4/2018 ............. G06N 3/063

OTHER PUBLICATIONS

Cheng, Hsin-Pai, et al., "Exploring the Optimal Learning Technique for IBM TrueNorth Platform to Overcome Quantization Loss", *2016 IEEE/ACM International Symposium on Nanoscale Architectures (Nanoarch). IEEE*, 2016, pp. 185-190 (6 pages in English).
(Continued)

*Primary Examiner* — Kamran Afshar
*Assistant Examiner* — Brian J Hales
(74) *Attorney, Agent, or Firm* — NSIP Law

(57) ABSTRACT

Disclosed is a processor-implemented data processing method in a neural network. A data processing apparatus includes at least one processor, and at least one memory configured to store instructions to be executed by the processor and a neural network, wherein the processor is configured to, based on the instructions, input an input activation map into a current layer included in the neural network, output an output activation map by performing a convolution operation between the input activation map and a weight quantized with a first representation bit number of the current layer, and output a quantized activation map by
(Continued)

quantizing the output activation map with a second representation bit number based on an activation quantization parameter.

26 Claims, 24 Drawing Sheets

(51) Int. Cl.
*G06N 3/04* (2023.01)
*G06V 40/00* (2022.01)

(56) References Cited

U.S. PATENT DOCUMENTS

| | | | |
|---|---|---|---|
| 2018/0004896 A1 | 1/2018 | Wright et al. | |
| 2018/0046894 A1* | 2/2018 | Yao | G06F 7/483 |
| 2018/0189981 A1* | 7/2018 | Singh | G06F 13/10 |
| 2018/0307783 A1* | 10/2018 | Hah | G06F 30/34 |
| 2019/0094858 A1* | 3/2019 | Radosavljevic | G08G 1/14 |
| 2019/0163955 A1* | 5/2019 | Asif | G06N 3/08 |
| 2019/0171927 A1* | 6/2019 | Diril | G06N 3/08 |
| 2019/0294413 A1* | 9/2019 | Vantrease | G06F 7/5095 |

OTHER PUBLICATIONS

Cai, Zhaowei, et al., "Deep Learning with Low Precision by Half-wave Gaussian Quantization", *Proceedings of the IEEE Conference on Computer Vision and Pattern Recognition*, 2017, pp. 5918-5926 (9 pages in English).

* cited by examiner

METHOD AND APPARATUS WITH NEURAL NETWORK PARAMETER QUANTIZATION

CROSS-REFERENCE TO RELATED APPLICATIONS

This application claims the benefit under 35 U.S.C. § 119(e) of U.S. Provisional Application No. 62/671,105 filed on May 14, 2018, and U.S. Provisional Application No. 62/677,348 filed on May 29, 2018 in the U.S. Patent and Trademark Office, and claims the benefit under 35 U.S.C. § 119(a) of Korean Patent Application No. 10-2018-0109197 filed on Sep. 12, 2018 in the Korean Intellectual Property Office in the Korean Intellectual Property Office, the entire disclosures of which are incorporated herein by reference for all purposes.

BACKGROUND

1. Field

The following description relates to the quantization of a neural network.

2. Description of Related Art

Technological automation of speech recognition has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implementing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented data processing method in a neural network includes inputting an input activation map into a current layer of the neural network, outputting an output activation map by performing a convolution operation between the input activation map and a weight quantized with a first representation bit number of the current layer; and outputting a quantized activation map by quantizing the output activation map with a second representation bit number based on an activation quantization parameter.

The activation quantization parameter may include a first threshold and a second threshold related to the output activation map, wherein the first threshold may indicate an upper limit of an activation map section with respect to the output activation map, and the second threshold indicates a lower limit of the activation map section.

The activation quantization parameter may include a first median value and a first difference value with respect to the output activation map, wherein the first difference value indicates a half of a difference between a first threshold and a second threshold, and the first median value indicates a middle value of the first threshold and the second threshold, wherein the first threshold indicates an upper limit of an activation map section with respect to the output activation map, and the second threshold indicates a lower limit of the activation map section.

The outputting of the output activation map may include performing the convolution operation by performing a multiplication operation and an accumulation operation, or performing a bit-wise operation with respect to the input activation map and the quantized weight.

The first representation bit number and the second representation bit number may be equal.

In a general aspect, a processor-implemented method of training a neural network includes initializing a weight of a current layer of the neural network, a first representation bit number related to the weight, a weight quantization parameter, a second representation bit number related to an output activation map output from the current layer, and an activation quantization parameter, calculating a loss based on the weight, the first representation bit number, the weight quantization parameter, the second representation bit number, and the activation quantization parameter with training data, and updating the weight, the first representation bit number, the weight quantization parameter, the second representation bit number, and the activation quantization parameter based on the calculated loss.

The calculating of the loss may include quantizing the weight based on the first representation bit number and the weight quantization parameter, outputting the output activation map by performing a convolution operation with respect to the quantized weight and an input activation map input into the current layer, quantizing the output activation map with the second representation bit number and the activation quantization parameter, and calculating the loss based on the quantized activation map.

The activation quantization parameter may include a first threshold and a second threshold related to the output activation map, and the weight quantization parameter includes a third threshold and a fourth threshold of an absolute value of the weight, wherein the first threshold indicates an upper limit of an activation map section with respect to the output activation map, and the second threshold indicates a lower limit of the activation map section, and wherein the third threshold indicates an upper limit of a weight section with respect to the absolute value of the weight, and the fourth threshold indicates a lower limit of the weight section.

The activation quantization parameter may include a first median value and a first difference value with respect to the output activation map, wherein the first difference value indicates a half of a difference between a first threshold and a second threshold, and the first median value indicates a middle value of the first threshold and the second threshold, wherein the first threshold indicates an upper limit of an activation map section with respect to the output activation map, and the second threshold indicates a lower limit of the activation map section, and the weight quantization parameter may include a second median value and a second difference value of an absolute value of the weight of the current layer, wherein the second difference value indicates a half of a difference between a third threshold and a fourth threshold, and the second median value indicates a middle value of the third threshold and the fourth threshold, wherein the third threshold indicates an upper limit of a weight section with respect to the absolute value of the weight, and the fourth threshold indicates a lower limit of the weight section.

In a general aspect, a processor-implemented method includes initializing a weight of a current layer of a first neural network, a first representation bit number related to the weight, a weight quantization parameter, a second representation bit number related to an output activation map output from the current layer, and an activation quantization parameter, updating the first representation bit number and the second representation bit number based on an accuracy calculated in a previous iteration, calculating a loss based on the weight, the updated first representation bit number, the weight quantization parameter, the updated second representation bit number, and the activation quantization parameter based on training data, updating the weight, the weight quantization parameter, and the activation quantization parameter based on the calculated loss, and calculating an accuracy to be implemented in a subsequent iteration with validity data based on the updated weight, the updated weight quantization parameter, and the updated activation quantization parameter.

The updating of the first representation bit number and the second representation bit number may include increasing or decreasing the first representation bit number and the second representation bit number by a preset bit number based on the calculated loss.

The updating of the first representation bit number and the second representation bit number may include updating the first representation bit number and the second representation bit number with a second neural network based on the calculated loss.

The updating of the first representation bit number and the second representation bit number comprises updating the first representation bit number and the second representation bit number based on a state and a reward including the accuracy calculated in the previous iteration, and wherein the state includes a quantization error of each of the activation quantization parameter and the weight quantization parameter, a distribution of the weight, and a distribution of the output activation map, and the reward includes the accuracy.

The activation quantization parameter may include a first threshold and a second threshold related to the output activation map, and the weight quantization parameter includes a third threshold and a fourth threshold of an absolute value of the weight, wherein the first threshold indicates an upper limit of an activation map section with respect to the output activation map, and the second threshold indicates a lower limit of the activation map section, and wherein the third threshold indicates an upper limit of a weight section with respect to the absolute value of the weight, and the fourth threshold indicates a lower limit of the weight section.

The activation quantization parameter may include a first median value and a first difference value with respect to the output activation map, wherein the first difference value indicates a half of a difference between a first threshold and a second threshold, and the first median value indicates a middle value of the first threshold and the second threshold, wherein the first threshold indicates an upper limit of an activation map section with respect to the output activation map, and the second threshold indicates a lower limit of the activation map section, and the weight quantization parameter includes a second median value and a second difference value of an absolute value of the weight of the current layer, wherein the second difference value indicates a half of a difference between a third threshold and a fourth threshold, and the second median value indicates a middle value of the third threshold and the fourth threshold, wherein the third threshold indicates an upper limit of a weight section with respect to the absolute value of the weight, and the fourth threshold indicates a lower limit of the weight section.

In a general aspect, a processor-implemented method of training a neural network includes initializing a first representation bit number related to a weight of a current layer of a pre-trained first neural network and a second representation bit number related to an output activation map output from the current layer, calculating a loss based on the pre-trained first neural network, the first representation bit number, and the second representation bit number based on training data, and updating the first representation bit number and the second representation bit number based on the calculated loss.

The updating may include increasing or decreasing the first representation bit number and the second representation bit number by a preset bit number based on the calculated loss.

The updating may include updating the first representation bit number and the second representation bit number with a second neural network based on the calculated loss.

In a general aspect, a processor-implemented method of training a neural network includes initializing a weight of a current layer of the neural network, a weight quantization parameter related to the weight, and an activation quantization parameter related to an output activation map output from the current layer, calculating a loss based on a pre-trained first representation bit number related to the weight, a pre-trained second representation bit number related to the output activation map, the weight, the weight quantization parameter, and the activation quantization parameter based on training data, and updating the weight, the weight quantization parameter, and the activation quantization parameter based on the calculated loss.

The method may include quantizing the weight based on the updated weight quantization parameter and the pre-trained first representation bit number, and storing the quantized weight and the activation quantization parameter.

In a general aspect, a data processing apparatus includes at least one processor, and at least one memory configured to store instructions to be executed by the at least one processor and a neural network, wherein the at least one processor is configured to, based on the instructions, input an input activation map into a current layer included in the neural network, output an output activation map by performing a convolution operation between the input activation map and a weight quantized with a first representation bit number of the current layer, and output a quantized activation map by quantizing the output activation map with a second representation bit number with an activation quantization parameter.

In a general aspect, a face recognition apparatus includes at least one processor, and at least one memory configured to store instructions to be executed by the at least one processor and a neural network, wherein the at least one processor is configured to, based on the instructions, output an input activation map from an input image comprising a facial image of a user, input the input activation map into a current layer included in the neural network, output an output activation map by performing a convolution operation between the input activation map and a weight quantized with a first representation bit number of the current layer, output a quantized activation map by quantizing the output activation map with a second representation bit number with an activation quantization parameter, and perform a user recognition process by processing the quantized activation map.

In a general aspect, a speech recognition apparatus includes at least one processor; and at least one memory configured to store instructions to be executed by the at least one processor and a neural network, wherein the at least one processor is configured to, based on the instructions, output an input activation map from speech data representing a word, input the input activation map into a current layer included in the neural network, output an output activation map by performing a convolution operation between the input activation map and a weight quantized with a first representation bit number of the current layer, output a quantized activation map by quantizing the output activation map with a second representation bit number with an activation quantization parameter, and perform a word recognition process by processing the quantized activation map.

In a general aspect, an autonomous driving control apparatus includes at least one processor, and at least one memory configured to store instructions to be executed by the at least one processor and a neural network, wherein the at least one processor is configured to, based on the instructions, output an input activation map from input data representing driving environment information of a vehicle, input the input activation map into a current layer included in the neural network, output an output activation map by performing a convolution operation between the input activation map and a weight quantized with a first representation bit number of the current layer, output a quantized activation map by quantizing the output activation map with a second representation bit number with an activation quantization parameter, and control a driving operation of the vehicle by processing the quantized activation map.

In a general aspect, a robot control apparatus includes at least one processor, and at least one memory configured to store instructions to be executed by the at least one processor and a neural network, wherein the at least one processor is configured to, based on the instructions, output an input activation map from input data representing environment information of a robot, input the input activation map into a current layer included in the neural network, output an output activation map by performing a convolution operation between the input activation map and a weight quantized with a first representation bit number of the current layer, output a quantized activation map by quantizing the output activation map with a second representation bit number based on an activation quantization parameter, and perform a control operation of the robot by processing the quantized activation map.

In a general aspect, a processor-implemented method includes inputting a first activation map corresponding to a first representation bit number from a first layer of a neural network, limiting a range of the first activation map based on an activation quantization parameter, quantizing the first activation map with a second representation bit number based on the activation quantization parameter, and outputting the quantized first activation map.

A convolution operation may be performed based on the quantized first activation map and a weight quantized with the first representation bit number.

The convolution operation may be performed based on one or both of a multiplication operation and an accumulation operation.

Other features and aspects will be apparent from the following detailed description, the drawings, and the claims.

Figure 1:
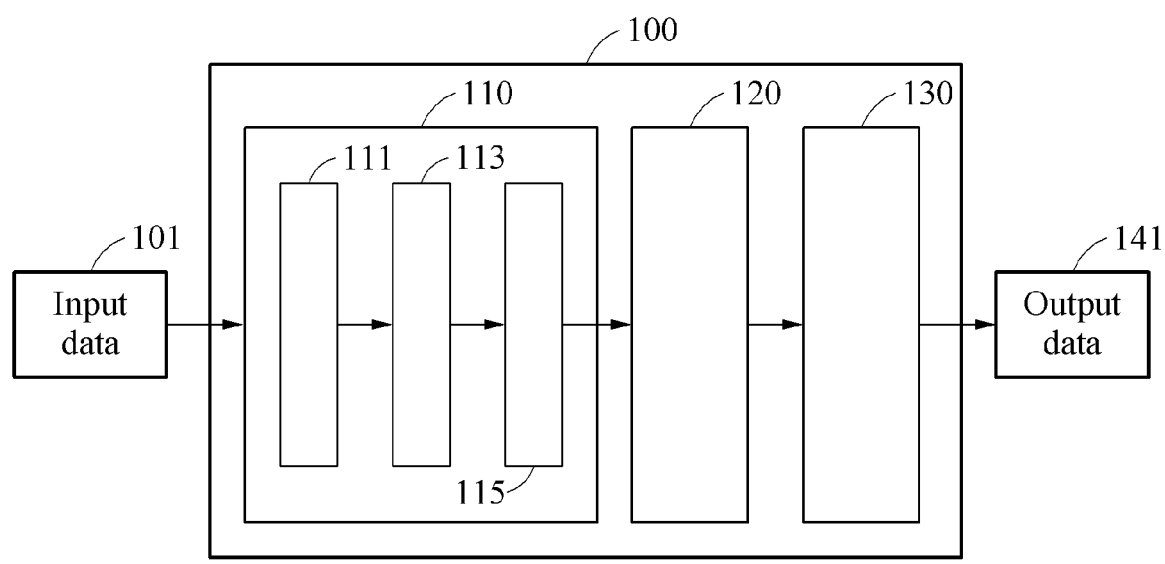
FIG. 1 illustrates an example of processing input data based on a quantized neural network, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It should be noted that if it is described that one component is "connected", "coupled", or "joined" to another component, a third component may be "connected", "coupled", and "joined" between the first and second components, although the first component may be directly connected, coupled, or joined to the second component.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Meanwhile, in some alternative implementations, functions or operations specified in predetermined blocks may be performed in an order different from that shown in a flowchart. For example, two successive blocks may be performed substantially concurrently in practice or may be performed in a reverse order depending upon the related functions or operations.

Hereinafter, for ease of description, a convolutional neural network (CNN) will be described as an example. However, a data processing apparatus and a training apparatus may also apply to various types of neural networks not including a convolutional layer.

For example, the neural network may be a deep neural network (DNN), as a non-limiting example. In such an example, the DNN may include one or more of a fully connected network, a deep convolutional network, a recurrent neural network (RNN), a recurrent deep neural network (RDNN), and/or a bidirectional recurrent neural network (BDRNN) may include different or overlapping neural network portions respectively with such full, convolutional, recurrent connections, and/or bidirectional recurrent connections.

Nodes of layers in the neural network may non-linearly affect each another. Also, parameters of the neural network such as values output from each of the nodes, connectional relationships between the nodes, and similar parameters may be optimized through learning, e.g., through loss-based back propagation.

The neural networks may be processor implemented neural network models, and various processes may be implemented through the neural network models as specialized computational architectures, which after substantial training may provide computationally intuitive mappings between input patterns and output patterns or pattern recognitions of input patterns, as non-limiting examples. The trained capability of generating such mappings or performing such example pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

FIG. 1 illustrates an example of processing input data with a quantized neural network.

A data processing apparatus 100 processes input data 101, and outputs output data 141 with a neural network. The data processing apparatus 100 quantizes output data of each layer and an internal parameter.

The data processing apparatus 100 quantizes the output data of each layer and the internal parameter, thereby improving a data processing rate while maintaining an accuracy of the output data 141. The data processing apparatus 100 quantizes the internal parameter, thereby lightening the neural network and reducing a required data storage space. The data processing apparatus 100 quantizes the output data of each layer, thereby reducing a time used for data processing.

Since the necessary data storage space may be reduced and resources used for data processing may be reduced, the data processing apparatus 100 may be applied to various types of terminals. For example, the data processing apparatus 100 may include a smart phone, a wearable device, a desktop, a laptop, or a vehicular processor, but is not limited thereto.

The data processing apparatus 100 processes the input data 101 with the neural network. The input data 101 may include image data, but is not limited thereto. For example, the data processing apparatus 100 may detect an object or recognize facial features from the input data 101 in an example of the input data being image data. The data processing apparatus 100 may includes a CNN principally used for image processing. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

The CNN is a network of a structure in which convolutional layers are combined at a front end of a general neural network. The CNN may be advantageous when extracting a feature from the image data. In an example in which classification is performed based on the feature extracted from the image data, a more accurate result may be derived.

The data processing apparatus 100 may include the neural network which includes a plurality of layers. For example, the data processing apparatus 100 may include a convolutional layer 110, a fully connected layer 120, and an output layer 130.

The convolutional layer 110 may extract a feature from the input data 101. The convolutional layer 110 may include a plurality of layers 111, 113, and 115. Each of the layers 111, 113, and 115 may include at least one filter and activation function. Each of the layers 111, 113, and 115 may further include a pooling layer. In each of the layers 111, 113, and 115, the filter and the activation function may be repeated alternately, and the pooling layer may be disposed at the end. The filter is also referred to as a kernel.

The filter corresponds to a single feature and detects whether a feature corresponding to the filter is present in the input data 101. The filter outputs a feature map. The activation function receives the feature map and outputs an activation map. The activation function converts values constituting the feature map into non-linear values, thereby indicating a degree of association with the feature. Each of the plurality of layers 111, 113, and 115 included in the convolutional layer 110 may include a layer acting as the filter, and a layer including the activation function. The layer acting as the filter has a weight as a parameter.

For example, the activation function may include a rectified linear unit (ReLu) function or a sigmoid function. However, examples are not limited thereto. In an example in which training is performed with back-propagation, the ReLu function alleviates the gradient vanishing problem although the depth of the layers increases.

The pooling layer performs subsampling with respect to the feature map representing the feature. The pooling layer reduces the size of the neural network and improves the data processing rate through subsampling. For example, the pooling layer performs maximum (max) pooling, average pooling, or minimum (min) pooling.

The fully connected layer 120 classifies the input data 101 based on the feature extracted from the convolutional layer 110. The fully connected layer 120 includes a plurality of hidden layers. Each hidden layer may have a weight as a parameter.

The output layer 130 calculates a final classification result. For example, the output layer 130 includes a softmax function which is a type of activation function. The softmax function calculates probabilities with respect to a number of classifications.

The description relates to a method of estimating a parameter to quantize an input (activation) of each layer and a lightened model (weight) and representation bit numbers optimized such that various deep neural network-based application technologies may operate in an efficient manner without a performance degradation in an embedded terminal such as a smart phone.

The data processing apparatus 100 may have a representation bit number for each layer as a parameter. The representation bit number is used to quantize a plurality of data distributed within a predetermined range. Here, a parameter indicating a predetermined range of data is referred to as a quantization parameter. Hereinafter, a weight quantization parameter refers to a parameter indicating a range of a weight. An activation quantization parameter refers to a parameter indicating a range of an activation map.

Among the layers of the data processing apparatus 100, a layer to perform filtering may have a weight as a parameter. The data processing apparatus 100 may include a representation bit number of the weight. The data processing apparatus 100 lightens the neural network by storing the weight quantized based on the representation bit number of the weight of each layer. Through this, it is possible to reduce a memory required for storing the neural network in a terminal having a limited memory resource.

The data processing apparatus 100 includes a representation bit number corresponding to an activation map output from each layer and an activation quantization parameter indicating a range of an activation map to be quantized. The data processing apparatus 100 quantizes the activation map based on the representation bit number, thereby improving the data processing rate. Accordingly, a power consumption may be reduced, and a computing time for processing data in a terminal having limited computing power and power capacity may also be reduced.

The data processing apparatus 100 may perform a low-bit convolution operation based on the quantized weight and the quantized activation map. For example, the data processing apparatus 100 may perform a low-bit, for example, 8-bit or lower-bit, fixed point operation, instead of a convolution operation of data represented with a 32-bit floating point.

The convolution operation is also referred as a composite product. The convolution operation includes a multiplication operation and an accumulation operation. The accumulation operation is also referred to as a summation operation.

The data processing apparatus 100 performs the convolution operation through a bit-wise operation. It is not necessary to equally set the representation bit number of the weight of the convolutional layer and the representation bit number of the activation map to be input into the convolutional layer. Accordingly, the data processing apparatus 100 may improve a speed of the convolution operation.

A representation bit number suitable for each layer may differ. The data processing apparatus 100 optimizes the weight quantization parameter and the activation quantization parameter for each layer. Further, the data processing apparatus 100 optimizes the weight quantization parameter and the activation quantization parameter concurrently. Accordingly, the data processing apparatus 100 obtains the weight quantization parameter and the activation quantization parameter exhibiting better performance, when compared to an example in which the activation quantization parameter is trained after the weight quantization parameter is trained.

Figure 2:
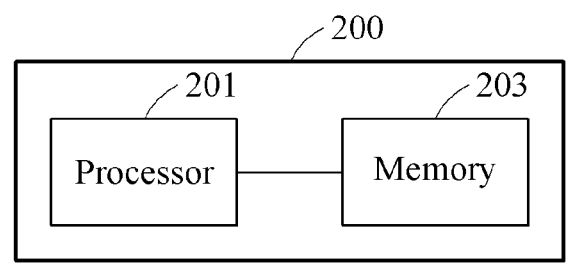
FIG. 2 illustrates an example of an overall configuration of a data processing apparatus, in accordance with one or more embodiments.

FIG. 2 illustrates an example of an overall configuration of a data processing apparatus.

A data processing apparatus 200 includes a processor 201 and a memory 203.

The memory 203 stores input data. For example, the input data may include image data, but is not limited thereto. The memory 203 stores instructions to be executed by the processor 201. The memory 203 may store a neural network including a first layer and a second layer. Here, the first layer and the second layer are terms used only to refer to different successive layers and are not limited to predetermined layers or a plurality of layers having a predetermined relationship, and the first layer is not limited to a layer in the first place of the neural network. Hereinafter, the first layer may also be referred to as a current layer, and the second layer may also be referred to as a subsequent layer.

The memory 203 stores a parameter of each layer of the neural network. The memory 203 stores a weight of the convolutional layer. The memory 203 stores a second representation bit number with respect to an activation map of each of the plurality of layers, an activation quantization parameter, and a weight quantized with a first representation bit number.

The memory 203 includes high-speed random access memories such as DRAM, SRAM, DDR RAM, or other random access semiconductor memories (solid state memories), and non-volatile memories such as at least one magnetic disk storage, optical disk storage, flash memory, or other non-volatile semiconductor storages.

The processor 201 outputs a first activation map from a first layer which is a current layer based on the instructions. For example, the first layer may be a convolutional layer. The processor 201 inputs input data output from a previous layer into the first layer and outputs the first activation map.

The processor 201 quantizes the first activation map with a second representation bit number based on an activation quantization parameter. The activation quantization parameter includes a parameter which limits a range of the first activation map. The processor 201 limits the range of the first activation map based on the activation quantization parameter, and quantizes the first activation map with the second representation bit number. Accordingly, the processor 201 converts the first activation map represented with high-bit floating points or fixed points into a quantized activation map represented with low-bit fixed points.

The processor 201 inputs the quantized first activation map into a second layer which is a subsequent layer. For example, the second layer may be a convolutional layer. The processor 201 outputs a second activation map based on the quantized first activation map and the weight quantized with the first representation bit number. The processor 201 performs a convolution operation based on the first activation map and the quantized weight. The processor 201 performs the convolution operation with respect to the quantized first activation map and the quantized weight based on a multiplication operation and an accumulation operation. The processor 201 performs the convolution operation with a bit-wise operation. In this example, a data processing rate improves. The bit-wise operation includes an AND operation and a POP COUNT operation or includes an XNOR operation and the POP COUNT operation. The first representation bit number and the second representation bit number may be equal to or different from each other.

Figure 3A:
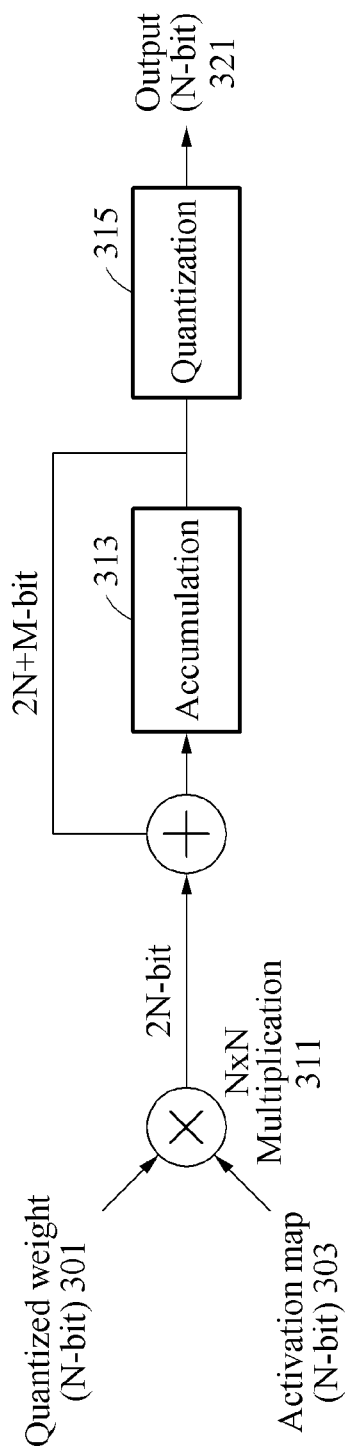
FIG. 3A illustrates an example of performing a convolution operation and a quantization in a single layer, in accordance with one or more embodiments.
Figure 3B:
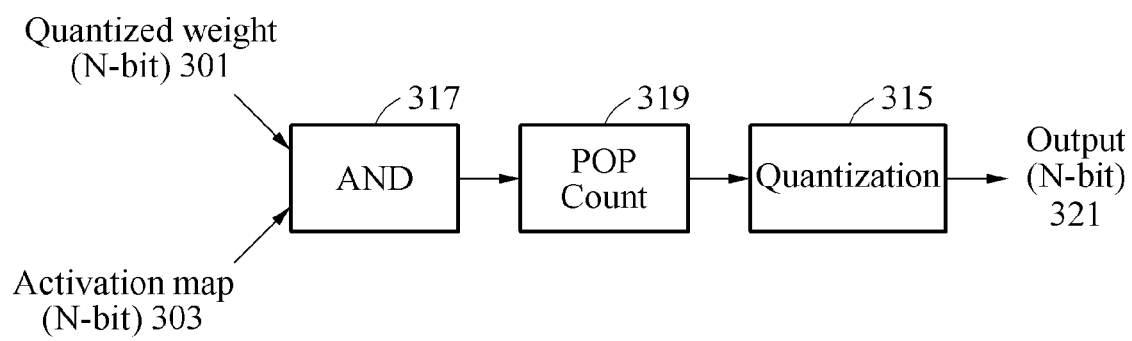
FIG. 3B illustrates an example of performing a convolution operation and a quantization based on AND and POP COUNT in a single layer, in accordance with one or more embodiments.
Figure 3C:
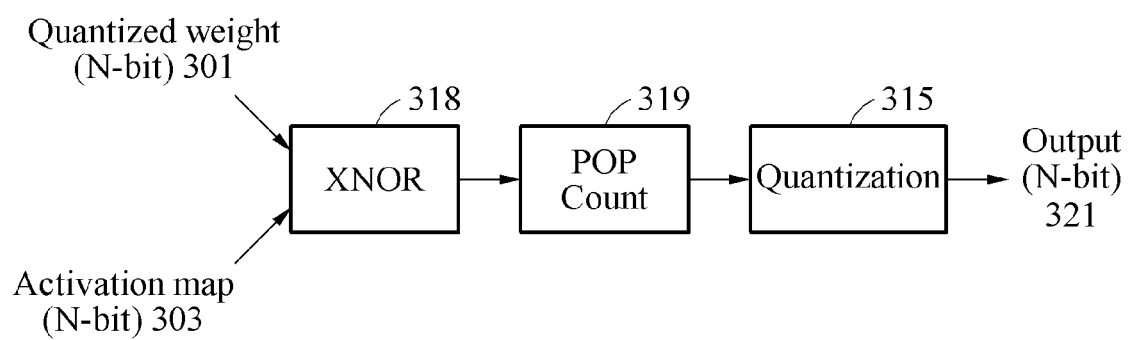
FIG. 3C illustrates an example of performing a convolution operation and a quantization based on XNOR and POP COUNT in a single layer, in accordance with one or more embodiments.

FIG. 3A illustrates an example of performing a convolution operation and a quantization in a single layer. FIG. 3B illustrates an example of performing a convolution operation and a quantization with AND and POP COUNT in a single layer. FIG. 3C illustrates an example of performing a convolution operation and a quantization with XNOR and POP COUNT in a single layer.

The data processing apparatus 100 performs a multiplication operation and an accumulation operation with respect to a weight quantized with a first representation bit number and a quantized activation map. Among at least one layer 111 of the convolutional layer 110 of FIG. 1, a layer to perform filtering may perform an operation as shown in FIG. 3A.

Referring to FIG. 3A, a first representation bit number of a quantized weight 301 of a convolutional layer, and a second representation bit number of an activation map 303 to be input into the convolutional layer may be equally "N". However, examples are not limited thereto. The first representation bit number and the second representation bit number may be different from each other.

The data processing apparatus 100 performs a multiplication operation 311 with respect to the quantized weight 301 and the quantized activation map 303. The data processing apparatus 100 outputs 2N-bit output data. Here, the multiplication operation 311 is a bit-wise operation and expedites a convolution operation.

The data processing apparatus 100 performs an accumulation operation 313 with respect to the 2N-bit output data and output data of a previous accumulation. Output data of an accumulation operation with respect to the 2N-bit output data exceeds 2N bits, and the data processing apparatus 100 adds extra M bits to the output data.

The data processing apparatus 100 quantizes the 2N+M-bit output data to N-bit data, in operation 315. Here, N denotes the second representation bit number. The data processing apparatus 100 converts the 2N+M-bit output data to the N-bit data within a range represented by an activation quantization parameter.

The data processing apparatus 100 outputs N-bit output data 321 as a result of the quantization. The N-bit output data 321 is input again into the subsequent layer 113 of the convolutional layer 110 of FIG. 1. In this manner, a bit-wise convolution operation is performed through quantization of an activation map and a weight of a neural network, and an expedition of the convolution operation is achieved.

Referring to FIGS. 3B and 3C, the data processing apparatus 100 performs a convolution operation and a quantization with respect to the quantized weight 301 and the activation map 303 based on a bit-wise operation. As illustrated in FIG. 3B, the data processing apparatus 100 may perform the convolution operation based on an AND operation 317 and a POP COUNT operation 319. As illustrated in FIG. 3C, the data processing apparatus 100 may perform the convolution operation based on an XNOR operation 318 and the POP COUNT operation 319.

Referring to FIGS. 3B and 3C, the data processing apparatus 100 may perform a convolution operation and a quantization with respect to the quantized weight 301 and the activation map 303 based on a bit-wise operation. The data processing apparatus 100 performs the convolution operation based on an AND operation 317 and a POP COUNT operation 319. The data processing apparatus 100 performs the convolution operation based on an XNOR operation 318 and the POP COUNT operation 319.

The bit-wise convolution operation is performed based on an inner product of two vectors. For example, the bit-wise convolution operation is performed based on the following equations.

$$x = \Sigma_{m=0}^{M-1} c_m(x) 2^m \qquad \text{Equation 1}$$

In example Equation 1, x denotes an M-bit fixed-point integer vector. $c_m(x)$ denotes a binary vector, and each element of $c_m(x)$ denotes a $2^m$-digit bit of each element of x.

$$y = \Sigma_{k=0}^{K-1} c_k(y) 2^k \qquad \text{Equation 2}$$

In example Equation 2, y denotes a K-bit fixed-point integer vector.

$$x \cdot y = \sum_{m=0}^{M-1} \sum_{k=0}^{K-1} 2^{m+k} bitcount[and(c_m(x), c_k(y))], \qquad \text{Equation 3}$$

$$c_m(x)_i, c_k(y)_i \in \{0, 1\} \forall i, m, k.$$

An inner product by x and y is performed as expressed by example Equation 3. Example Equation 3 expresses an inner product of an example in which x, y has an element of {0, 1}, and an AND operation is used. Conversely, an inner product of an example in which x, y has an element of {-1, 1} may perform an XNOR operation, instead of the AND operation. In this example, Equation 3 is partially modified.

Figure 4:
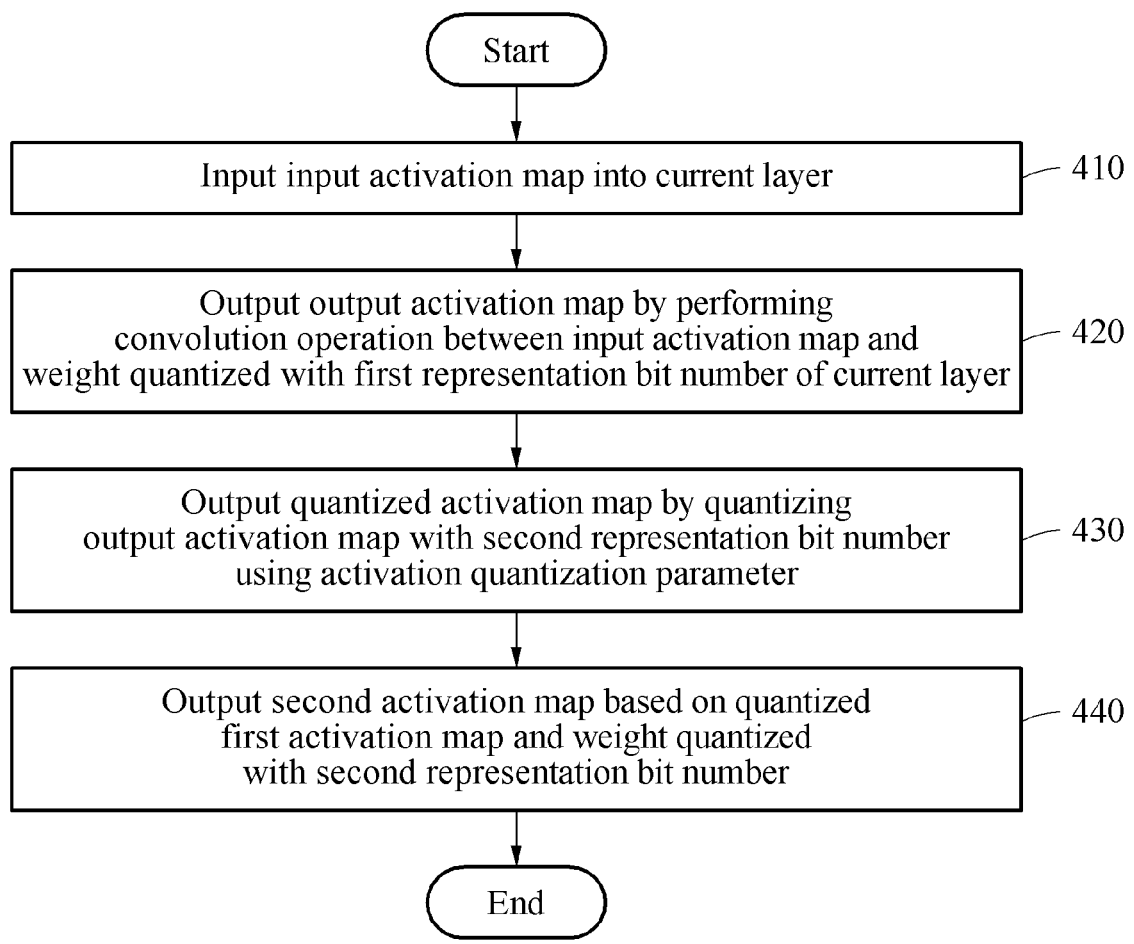
FIG. 4 illustrates an example of operations of a data processing method, in accordance with one or more embodiments.

FIG. 4 illustrates an example of operations of a data processing method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, a neural network includes a current layer and a subsequent layer. The current layer may have a second representation bit number with respect to an activation map and an activation quantization parameter. The subsequent layer may have a weight quantized with a first representation bit number. Here, the current layer and the subsequent layer are terms indicating an order in which the current layer is followed by the subsequent layer. The current layer and the subsequent layer do not necessarily need to be connected directly to each other, and another layer to perform another operation may be included therebetween. For example, a pooling layer is included between the current layer and the subsequent layer.

A quantized weight of each layer may be calculated based on the first representation bit number and a weight quantization parameter derived during a training process. The quantization parameter may be quantized with the first representation bit number from high-bit to low-bit within a range set by the weight quantization parameter.

Referring to FIG. 4, in operation 410, the data processing apparatus 100 inputs an input activation map into a current layer. The following process is also performed identically in a subsequent layer.

In operation 420, the data processing apparatus 100 outputs an output activation map by performing a convolution operation between the input activation map and a weight quantized with a first representation bit number of the current layer. A first activation map is a result of performing the convolution operation. By an accumulation operation of the convolution operation, the first activation map has a representation bit number greater than a second representation bit number.

In operation 430, the data processing apparatus 100 outputs a quantized activation map by quantizing the output activation map with the second representation bit number based on an activation quantization parameter. The data processing apparatus 100 quantizes the first activation map with the second representation bit number within a range defined by the activation quantization parameter. The quantized first activation map is represented by the second representation bit number. Since the representation bit number decreases, a data processing rate may decrease. Accordingly, an expedition of the convolution operation is achieved.

Figure 5:
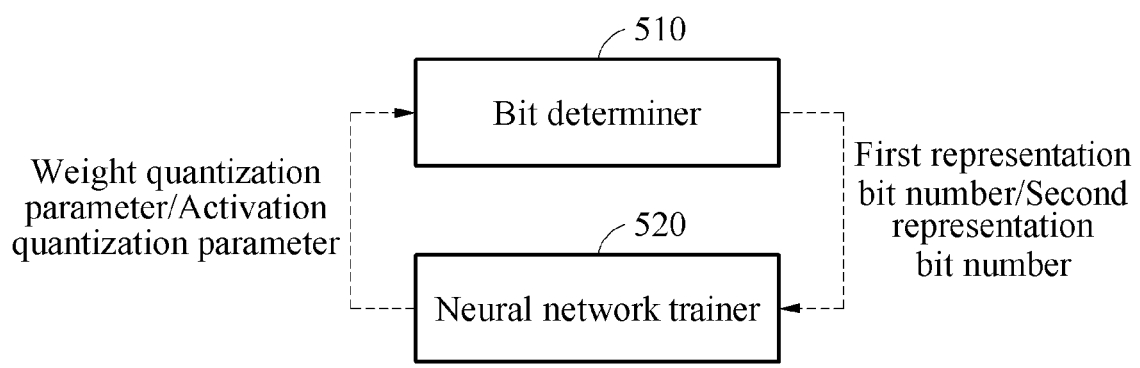
FIG. 5 illustrates an example of a configuration of a neural network training apparatus training representation bit numbers and quantization parameters step by step, in accordance with one or more embodiments.

FIG. 5 illustrates an example of a configuration of a neural network training apparatus training representation bit numbers and quantization parameters step by step.

A neural network training apparatus may train a neural network with training data so as to minimize a loss of the neural network. Training of the neural network is a type of optimization problem solving process, wherein parameters of the neural network are optimized.

Representation bit numbers and quantization parameters may be trained alternatively, trained step by step, or trained concurrently.

In an example, the neural network training apparatus performs training of a first representation bit number and a second representation bit number and training of a weight quantization parameter, an activation quantization parameter, and a weight step by step. For example, a bit determiner 510 and a neural network trainer 520 are trained through reinforcement learning.

In another example, the neural network training apparatus trains the first representation bit number, the second representation bit number, the weight quantization parameter, the activation quantization parameter, and the weight together.

In still another example, the neural network training apparatus trains the first representation bit number and the second representation bit number while fixing the quantization parameters. In yet another example, the neural network training apparatus trains the weight quantization parameter, the activation quantization parameter, and the weight while fixing the representation bit numbers.

Referring to FIG. 5, the neural network training apparatus trains the first representation bit number and the second representation bit number and trains the weight quantization parameter, the activation quantization parameter, and the weight. The neural network training apparatus trains the first representation bit number and the second representation bit number with respect to each of a plurality of layers. The trained neural network stores the first representation bit number and the weight quantized with the weight quantization parameter as parameters. The trained neural network stores the second representation bit number and the activation quantization parameter, thereby quantizing in real time an activation map output from each layer in a data processing process.

The neural network training apparatus includes the bit determiner 510 and the neural network trainer 520. The bit determiner 510 is also referred to as a bit decision system. The neural network trainer 520 is also referred to as a low-precision network training system.

The bit determiner 510 determines the first representation bit number with respect to a weight of each layer and the second representation bit number with respect to the activation map output from each layer. The bit determiner 510 transmits the determined first representation bit number and second representation bit number to the neural network trainer 520.

The neural network trainer 520 trains the neural network with training data based on the first representation bit number and the second representation bit number determined in a previous iteration. The neural network trainer 520 trains the weight quantization parameter indicating a range set to quantize the weight with the first representation bit number. The neural network trainer 520 trains the activation quantization parameter indicating a range set to quantize the activation map with the second representation bit number. The neural network trainer 520 transmits the trained weight quantization parameter and activation quantization parameter to the bit determiner 510.

The bit determiner 510 determines the first representation bit number and the second representation bit number again based on the trained weight quantization parameter and activation quantization parameter. The above process is iterated until a predetermined condition is satisfied. For example, the above process is iterated until the loss is less than or equal to a preset threshold.

Figure 6:
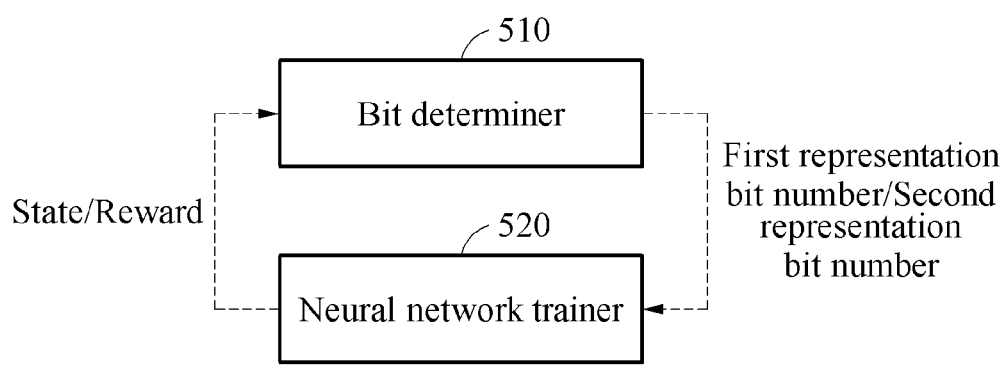
FIG. 6 illustrates an example of a configuration of a neural network training apparatus based on reinforcement learning, in accordance with one or more embodiments.

FIG. 6 illustrates an example of a configuration of a neural network training apparatus based on reinforcement learning.

A neural network training apparatus trains a first neural network by reinforcement learning based on a state and a reward. The state includes a quantization error of each of a weight quantization parameter and an activation quantization parameter, a distribution of a weight of each of a plurality of layers, and a distribution of an activation map, and the reward includes a loss.

The neural network training apparatus includes the bit determiner 510 and the neural network trainer 520. The bit determiner 510 determines a first representation bit number with respect to the weight of each layer and a second representation bit number with respect to an activation map output from each layer. The bit determiner 510 transmits the determined first representation bit number and second representation bit number to the neural network trainer 520.

The neural network trainer 520 trains a neural network with training data based on the determined first representation bit number and second representation bit number. The neural network trainer 520 trains the weight quantization parameter indicating a range set to quantize the weight with the first representation bit number. The neural network trainer 520 trains the activation quantization parameter indicating a range set to quantize the activation map with the second representation bit number. At the same time, the neural network trainer 520 trains the weight.

The neural network trainer 520 calculates the quantization error of each of the weight quantization parameter and the activation quantization parameter. The neural network trainer 520 calculates the distribution of the weight of each of the plurality of layers and the distribution of the activation map. The neural network trainer 520 calculates the loss. The neural network trainer 520 calculates the loss based on validity data.

The neural network trainer 520 transmits the reward and the state including the trained weight quantization parameter and activation quantization parameter to the bit determiner 510. The bit determiner 510 determines the first representation bit number and the second representation bit number again based on the state and the reward. The above process is iterated until a predetermined condition is satisfied. For example, the above process is iterated until the loss is less than or equal to a preset threshold.

Figure 7A:
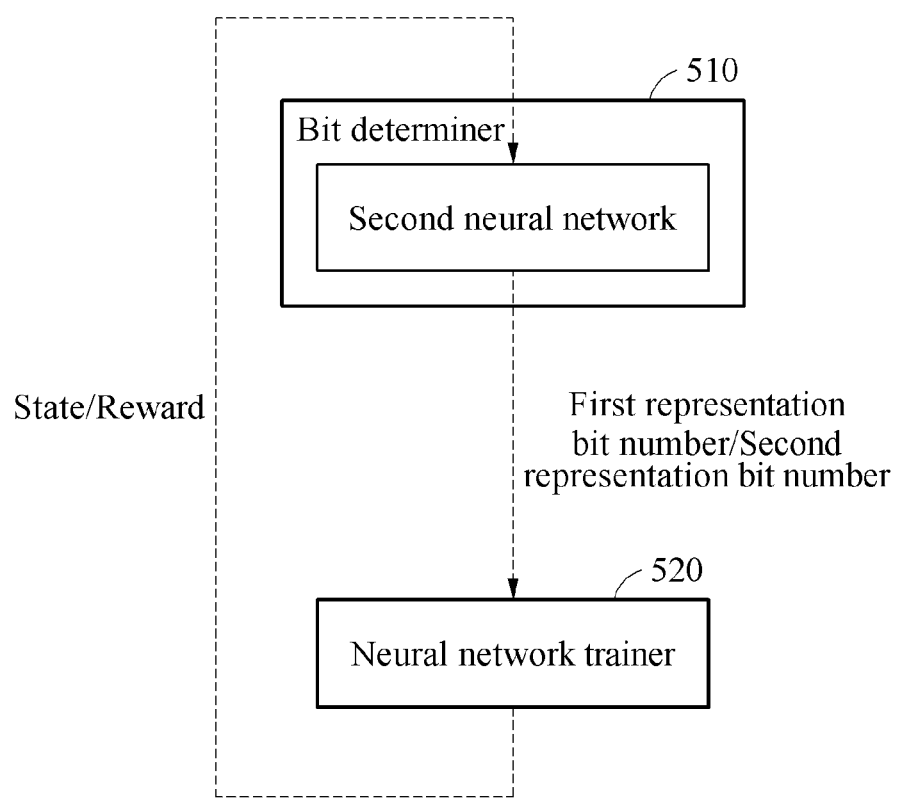
FIG. 7A illustrates an example of a configuration of a bit determiner including a second neural network in a neural network training apparatus based on reinforcement learning, in accordance with one or more embodiments.

FIG. 7A illustrates an example of a configuration of a bit determiner including a second neural network in a neural network training apparatus based on reinforcement learning.

Figure 7B:
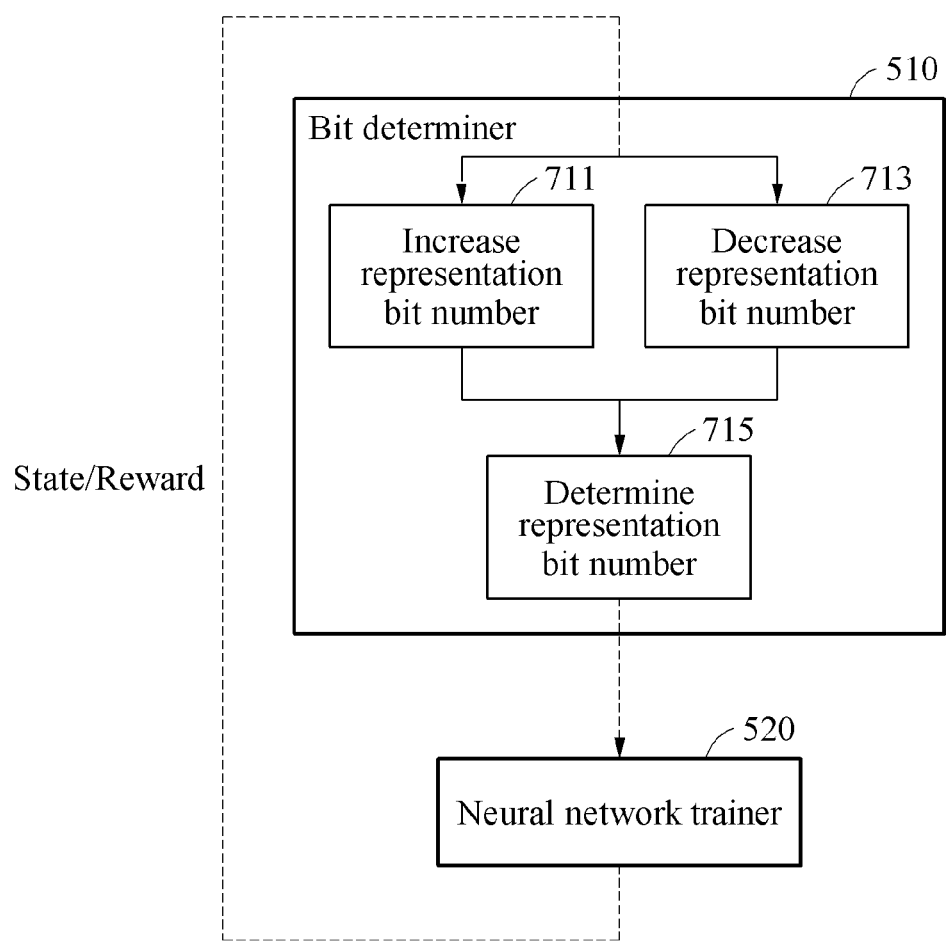
FIG. 7B illustrates an example of a configuration of a bit determiner based on an increasing or decreasing function in a neural network training apparatus based on reinforcement learning, in accordance with one or more embodiments.

FIG. 7B illustrates an example of a configuration of a bit determiner based on an increasing or decreasing function in a neural network training apparatus based on reinforcement learning.

Referring to FIG. 7A, the bit determiner 510 includes a second neural network. The bit determiner 510 updates a first representation bit number and a second representation bit number based on the second neural network based on a state and a reward. For example, the bit determiner 510 inputs the state and the reward into an input layer of the second neural network and updates the first representation bit number and the second representation bit number based on a final output value. The bit determiner 510 determines the first representation bit number and the second representation bit number with respect to each layer of a first neural network.

Referring to FIG. 7B, the bit determiner 510 includes a function to increase or decrease a representation bit number of each layer. The bit determiner 510 receives the state/reward from the neural network trainer 520. Based on the state/reward, the bit determiner 510 increases the representation bit number in operation 711, or decreases the representation bit number in operation 713. The bit determiner 510 increases or decreases the first representation bit number and the second representation bit number by a preset bit number based on a loss. The bit determiner 510 iteratively increases/decreases the representation bit number until an optimal representation bit number is determined for each layer. In operation 715, the bit determiner 510 determines the representation bit number for each layer.

Figure 8:
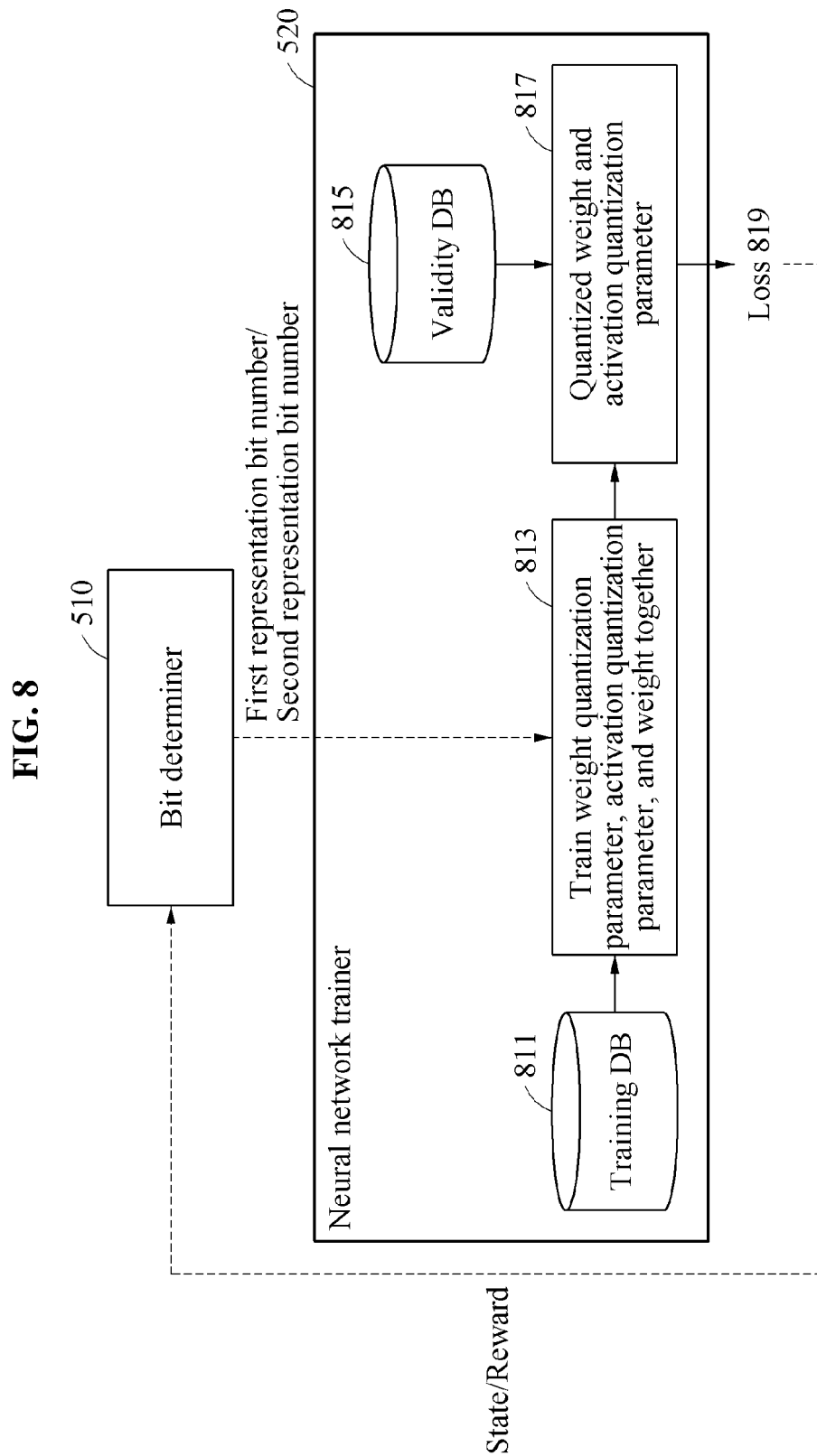
FIG. 8 illustrates an example of an overall configuration of a neural network trainer in a neural network training apparatus based on reinforcement learning, in accordance with one or more embodiments.

FIG. 8 illustrates an example of an overall configuration of a neural network trainer in a neural network training apparatus based on reinforcement learning.

Referring to FIG. 8, the bit determiner 510 determines a first representation bit number and a second representation bit number based on a state/reward including a weight quantization parameter, an activation quantization parameter, and a loss received from the neural network trainer 520. The bit determiner 510 transmits the determined first representation bit number and second representation bit number to the neural network trainer 520.

The neural network trainer 520 updates the weight quantization parameter and the activation quantization parameter based on the determined first representation bit number and second representation bit number. The neural network trainer 520 trains the weight quantization parameter, the activation quantization parameter, and the weight together with training data stored in a training database (DB) 811 based on the first representation bit number and the second representation bit number, in operation 813. Here, the training data may be data to train the weight quantization parameter, the activation quantization parameter, and the weight of the neural network.

The neural network trainer 520 outputs a quantized weight based on the trained quantization parameters and weight. The neural network trainer 520 calculates a loss 819 with validity data stored in a validity DB 815 based on the trained activation quantization parameter and the quantized weight 817. Here, the validity data may be data used to calculate an error or an accuracy based on parameters of the neural network.

The neural network trainer 520 transmits the state/reward including the weight quantization parameter, the activation quantization parameter, and the loss 819 to the bit determiner 510. For example, the state includes a quantization error of each of the weight quantization parameter and the activation quantization parameter, a distribution of a weight of each of a plurality of layers, and a distribution of an activation map, and the reward includes the loss.

If the loss 819 is less than a loss calculated in a previous iteration, the bit determiner 510 updates the first representation bit number and the second representation bit number based on the loss, the weight quantization parameter, and the activation quantization parameter. The above training process is iterated until a predetermined condition is satisfied. For example, the training process is iterated until a condition that the loss 819 is less than or equal to a threshold is satisfied.

Figure 9:
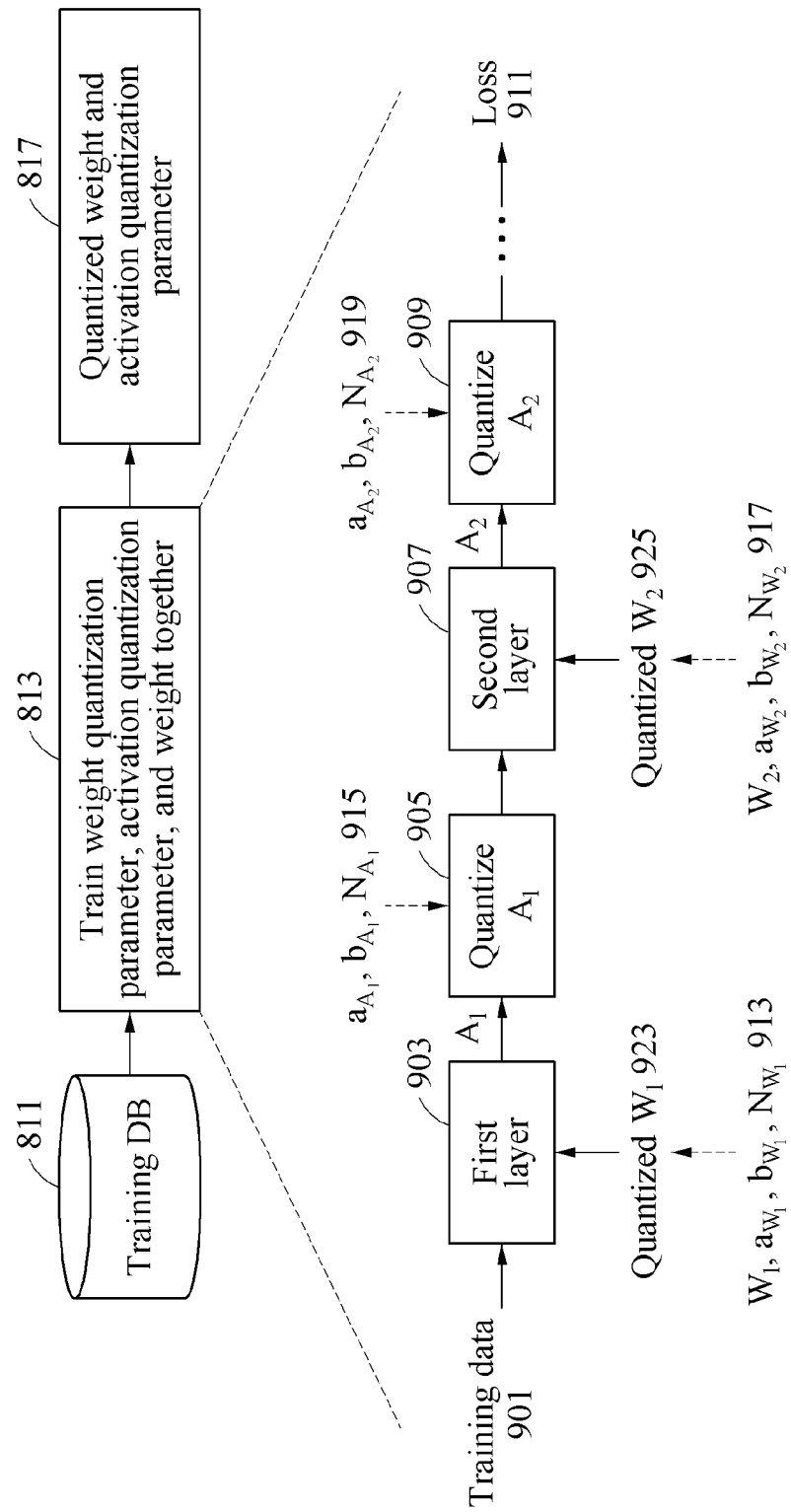
FIG. 9 illustrates an example of a structure of a neural network training apparatus training a weight quantization parameter, an activation quantization parameter, and a weight together.

FIG. 9 illustrates an example of a structure of a neural network training apparatus training a weight quantization parameter, an activation quantization parameter, and a weight together.

A neural network training apparatus trains a weight quantization parameter, an activation quantization parameter, and a weight together. The neural network training apparatus trains the weight quantization parameter and the activation quantization parameter together, thereby achieving a high-level optimization when compared to an example in which the weight quantization parameter and the activation quantization parameter are trained separately.

Referring to FIG. 9, in operation 813, the neural network training apparatus trains a weight quantization parameter, an activation quantization parameter, and a weight together based on the training DB 811. In response to the training of a first representation bit number and a second representation bit number being completed, the neural network training apparatus trains the weight quantization parameter, the activation quantization parameter, and the weight together based on the first representation bit number and the second representation bit number. As described above, the neural network training apparatus performs training of the representation bit numbers and training of the quantization parameters separately.

The neural network training apparatus outputs the weight quantization parameter and the activation quantization parameter as a result of training. In operation 817, the neural network training apparatus outputs a quantized weight based on the weight quantization parameter and the weight. The neural network training apparatus outputs the activation quantization parameter and the quantized weight for each layer of the neural network.

The neural network training apparatus calculates a loss 911 based on the trained weight quantization parameter and activation quantization parameter with training data 901. Here, the loss 911 reflects an accuracy. The accuracy is an index indicating how accurately the neural network classifies validity data. For example, the loss 911 decreases as the accuracy increases, and the loss 911 increases as the accuracy decreases. The neural network training apparatus trains the weight quantization parameter and the activation quantization parameter so as to increase the accuracy.

A weight of a layer of the neural network is represented with high-bit. For example, the weight is represented in a 32-bit floating-point manner or fixed-point manner. The weight is distributed in a predetermined range within a range represented with 32-bit floating points. The weight may have a maximum value and a minimum value and may be distributed intensively in a predetermined range between the maximum value and the minimum value.

The weight may be converted into low-bit in view of a distribution state or an accuracy. Here, the weight may be less than "0", and thus an absolute value of the weight may be considered. For example, the absolute value of the weight may be represented with a low-bit based on an upper limit and a lower limit. If the upper limit and the lower limit are determined in view of the distribution state of the weight, a decrease in the accuracy is minimized despite the low-bit conversion. Conversely, in response to a decrease in representation bit number, a memory efficiency and a computing speed may improve greatly.

The weight quantization parameter may include a third threshold and a fourth threshold of an absolute value of a weight of each of a plurality of layers. Here, an upper limit of a weight section of a weight represented with the first representation bit number is referred to as the third threshold, and a lower limit of the weight section is referred to as the fourth threshold.

An activation map is converted into a low-bit in view of the distribution state. Unlike the weight, the activation map may use an activation function. If a ReLu function is used as the activation function, an activation value is greater than, or equal to, "0". When the upper limit and the lower limit of an activation map section are determined based on the distribution state of the activation map, a decrease in the accuracy is minimized despite the low-bit conversion. Conversely, in response to a decrease in representation bit number, a memory efficiency and a computing speed improve.

The activation quantization parameter includes a first threshold and a second threshold of the activation map of each of the plurality of layers. Here, an upper limit of a section of the activation map represented with the second representation bit number is referred to as the first threshold, and a lower limit of the section of the activation map is referred to as the second threshold.

The distribution state of the weight is represented with a median value of the section and an interval of the section, instead of the upper limit and the lower limit of the section. Here, a second median value and a second difference value of an absolute value of a weight of a current layer are used. The second difference value indicates a half of a difference between the third threshold and the fourth threshold, and the second median value indicates a middle of the third threshold and the fourth threshold.

The distribution state of the activation map is represented with a median value of the section and an interval of the section instead of the upper limit and the lower limit of the section. A first median value and a first difference value with respect to the output activation map may be used. The first difference value indicates a half of a difference between the first threshold and the second threshold, and the first median value indicates a middle of the first threshold and the second threshold.

Referring to FIG. 9, the neural network training apparatus trains a weight quantization parameter and an activation quantization parameter together for each layer with training data 901 based on a determined first representation bit number and a second representation bit number.

In a previous iteration, the neural network training apparatus stores a lower limit $a_{w1}$, an upper limit $b_{w1}$, and a representation bit number $N_{w1}$ to represent a quantized weight $W_1$ as a result of lightening a weight $W_1$. In operation 913, the neural network training apparatus retrieves, from a memory, the representation bit number $N_{w1}$ of a first layer determined in the previous iteration, and a lower limit $a_{w1}$ and an upper limit $b_{w1}$ of the weight $W_1$ of the first layer 903. Here, the lower limit $a_{w1}$ and the upper limit $b_{w1}$ are included in a weight quantization parameter of the first layer.

In operation 923, the neural network training apparatus obtains the quantized weight $W_1$. The neural network training apparatus quantizes the weight $W_1$ with the representation bit number $N_{w1}$ of the first layer determined in the previous iteration within the range of the lower limit $a_{w1}$ and the upper limit $b_{w1}$. The neural network training apparatus outputs an activation map $A_1$ from the training data 901 based on the quantized weight $W_1$.

In the previous iteration, the neural network training apparatus stores a second representation bit number $N_{A1}$ of the activation map $A_1$, and a lower limit $a_{A1}$ and an upper limit $b_{A1}$ of the activation map $A_1$. In operation 915, the neural network training apparatus retrieves, from the memory, the second representation bit number $N_{A1}$ of the activation map $A_1$, and the lower limit am and the upper limit $b_{A1}$ of the activation map $A_1$. Here, the lower limit am and the upper limit $b_{A1}$ may be included in an activation quantization parameter of the first layer.

In operation 905, the neural network training apparatus quantizes the activation map $A_1$. The neural network training apparatus quantizes the activation map $A_1$ based on the second representation bit number $N_{A1}$, the lower limit am, and the upper limit $b_{A1}$. The quantized activation map $A_1$ is transmitted to a second layer.

In the previous iteration, the neural network training apparatus stores a lower limit $a_{w2}$, a maximum value $b_{w2}$, and a representation bit number $N_{w2}$ to represent a quantized weight $W_2$. In operation 917, the neural network training apparatus retrieves, from the memory, the representation bit number $N_{w2}$ of a second layer determined previously, and the lower limit $a_{w2}$ and the upper limit $b_{w2}$ of the weight $W_2$ of the second layer 907. Here, the lower limit $a_{w2}$ and the upper limit $b_{w2}$ may be included in a weight quantization parameter of the second layer.

In operation 925, the neural network training apparatus obtains the quantized weight $W_2$. The neural network training apparatus quantizes the weight $W_2$ with the already determined representation bit number $N_{w2}$ of the second layer within the range of the lower limit $a_{w2}$ and the upper limit $b_{w2}$.

The neural network training apparatus outputs an activation map $A_2$ from the quantized activation map $A_1$ based on the quantized weight $W_2$.

In the previous iteration, the neural network training apparatus stores, in the memory, a second representation bit number $N_{A2}$ of the activation map $A_2$, and a lower limit $a_{A2}$ and an upper limit $b_{A2}$ of the activation map $A_2$. In operation 919, the neural network training apparatus retrieves, from the memory, the second representation bit number $N_{A2}$ of the activation map $A_2$, and the lower limit $a_{A2}$ and the upper limit $b_{A2}$ of the activation map $A_2$. Here, the lower limit $a_{A2}$ and the upper limit $b_{A2}$ are included in an activation quantization parameter of the second layer.

In operation 909, the neural network training apparatus quantizes the activation map $A_2$. The neural network training apparatus quantizes the activation map $A_2$ based on the second representation bit number $N_{A2}$, the lower limit $a_{A2}$, and the upper limit $b_{A2}$. The quantized activation map $A_2$ is transmitted to a third layer.

In operation 911, the neural network training apparatus outputs a loss of the neural network trained based on the training data 901. Here, the loss is associated with an accuracy of the trained quantization parameter. The neural network training apparatus updates the quantization parameter for each layer based on the loss. As described above, the weight quantization parameter and the activation quantization parameter are trained with respect to each of the plurality of layers of the neural network.

Figure 10:
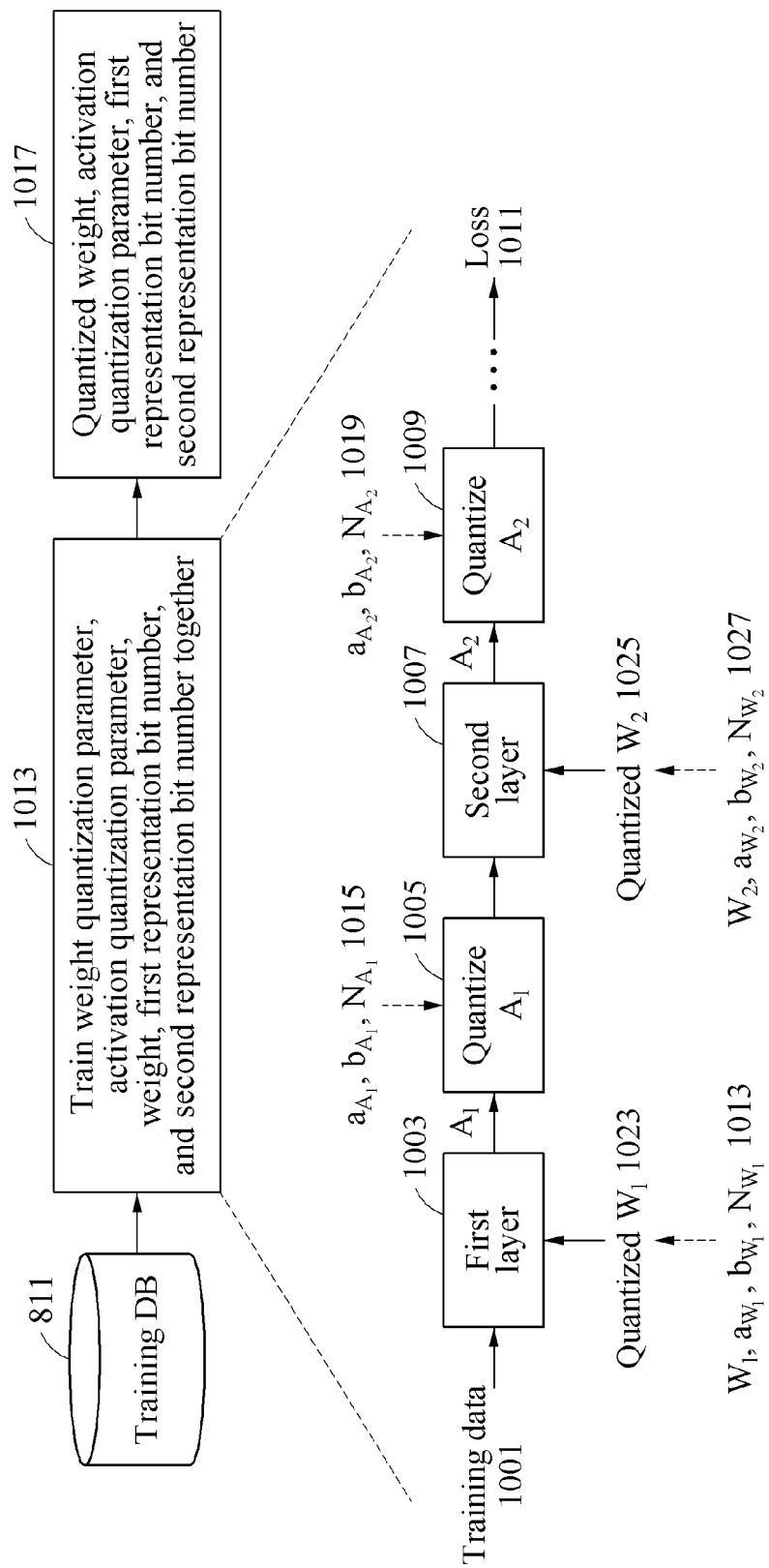
FIG. 10 illustrates an example of a structure of a neural network training apparatus training representation bit numbers, quantization parameters, and a weight together, in accordance with one or more embodiments.

FIG. 10 illustrates an example of a structure of a neural network training apparatus training representation bit numbers, quantization parameters, and a weight together.

Referring to FIG. 10, in operation 1013, a neural network training apparatus trains a first representation bit number, a second representation bit number, a weight quantization parameter, an activation quantization parameter, and a weight together based on the training DB 811. As described above, the neural network training apparatus performs training of the representation bit numbers and training of the quantization parameters concurrently. A bit determiner may be matched to a neural network trainer.

In operation 1017, the neural network training apparatus outputs the first representation bit number, the second representation bit number, the weight quantization parameter, the activation quantization parameter, and the weight as a result of training. The neural network training apparatus outputs the first representation bit number, the second representation bit number, the weight quantization parameter, the activation quantization parameter, and the weight for each layer of a neural network.

The neural network training apparatus calculates a loss based on the trained first representation bit number, second representation bit number, weight quantization parameter, activation quantization parameter, and weight based on validity data. Here, the loss reflects an accuracy and a performance. Here, the performance refers to an index indicating a computing speed or a performance associated with a required memory. For example, the loss decreases as the accuracy increases, and the loss increases as the accuracy decreases. In general, the accuracy decreases as the representation bit number decreases, and thus the neural network is trained to derive an optimal result between the performance and the accuracy. The neural network training apparatus trains parameters so as to optimize a speed/performance ratio.

Referring to FIG. 10, the neural network training apparatus trains the first representation bit number, the second representation bit number, the weight quantization parameter, the activation quantization parameter, and the weight together for each layer based on training data 1001.

In a previous iteration, the neural network training apparatus stores a lower limit $a_{w1}$, an upper limit $b_{w1}$, and a representation bit number $N_{w1}$ to represent a quantized weight $W_1$. In operation 1013, the neural network training apparatus retrieves, from a memory, the representation bit number $N_{w1}$ of a first layer, and the lower limit $a_{w1}$ and the upper limit $b_{w1}$ of the weight $W_1$ of the first layer 1003.

In operation 1023, the neural network training apparatus obtains the quantized weight $W_1$. The neural network training apparatus quantizes the weight $W_1$ with the representation bit number $N_{w1}$ of the first layer within the range of the lower limit $a_{w1}$ and the upper limit $b_{w1}$. The neural network training apparatus outputs an activation map $A_1$ from the training data 1001 based on the quantized weight $W_1$.

In the previous iteration, the neural network training apparatus stores, in the memory, a second representation bit number $N_{A1}$, and a lower limit am and an upper limit $b_{A1}$ of the activation map $A_1$. In operation 1015, the neural network training apparatus retrieves, from the memory, the second representation bit number $N_{A1}$, and the lower limit am and the upper limit $b_{A1}$ of the activation map $A_1$.

In operation 1005, the neural network training apparatus quantizes the activation map $A_1$. The neural network training apparatus quantizes the activation map $A_1$ based on the second representation bit number $N_{A1}$, the lower limit $a_{A1}$, and the upper limit $b_{A1}$. The quantized activation map $A_1$ is transmitted to a second layer 1007.

In the previous iteration, the neural network training apparatus stores, in the memory, a lower limit $a_{w2}$, an upper limit $b_{w2}$, and a representation bit number $N_{w2}$ to represent a quantized weight $W_2$. In operation 1027, the neural network training apparatus retrieves, from the memory, the representation bit number $N_{w2}$ of the second layer, and the lower limit $a_{w2}$ and the upper limit $b_{w2}$ of the weight $W_2$ of the second layer 1007.

In operation 1025, the neural network training apparatus obtains the quantized weight $W_2$. The neural network training apparatus quantizes the weight $W_2$ with the representation bit number $N_{w2}$ of the second layer within the range of the lower limit $a_{w2}$ and the upper limit $b_{w2}$. The neural network training apparatus outputs an activation map $A_2$ from the quantized activation map $A_1$ based on the quantized weight $W_2$.

In the previous iteration, the neural network training apparatus stores, in the memory, a lower limit $a_{A2}$ and an upper limit $b_{A2}$ of the activation map $A_2$ based on a second representation bit number $N_{A2}$. In operation 1019, the neural network training apparatus retrieves, from the memory, the lower limit $a_{A2}$ and the upper limit $b_{A2}$ of the activation map $A_2$ based on the second representation bit number $N_{A2}$.

In operation 1009, the neural network training apparatus quantizes the activation map $A_2$. The neural network training apparatus quantizes the activation map $A_2$ based on the second representation bit number $N_{A2}$, the lower limit $a_{A2}$, and the upper limit $b_{A2}$. The quantized activation map $A_2$ is transmitted to a third layer.

As described above, the first representation bit number, the second representation bit number, the weight quantization parameter, the activation quantization parameter, and the weight are trained with respect to each of a plurality of layers of the neural network. In operation 1011, the neural network training apparatus outputs a loss of the neural network trained with the training data 1001. Here, the loss is an index related to an accuracy and a performance of the trained quantization parameters.

Figure 11A:
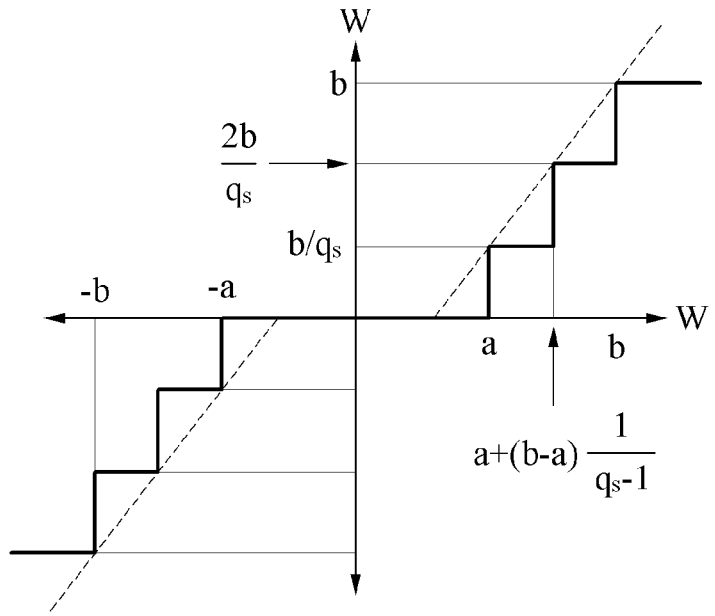
FIG. 11A illustrates an example of a forwarding function used for weight quantization by a neural network training apparatus, in accordance with one or more embodiments.

FIG. 11A illustrates an example of a forwarding function used for weight quantization by a neural network training apparatus.

A weight quantization parameter includes a third threshold and a fourth threshold of an absolute value of a weight of each of a plurality of layers. Here, an upper limit of a weight represented with a first representation bit number is referred to as the third threshold, and a lower limit of the weight is referred to as the fourth threshold.

The weight may be a full-precision value. The weight may be represented with a high-bit. By quantization, the weight may be approximated to a set of discrete values represented with a fixed-point integer and a scale factor. For example, a value $\bar{v}$ quantized from a positive real value v is calculated as expressed by Example Equation 4 below.

$$\bar{v} = \frac{\lfloor (v/s) \cdot q_L \rfloor}{q_L} \cdot s \qquad \text{Equation 4}$$

In Equation 4, $q_L$ denotes a quantization level, and $\lfloor \cdot \rfloor$ denotes an operation of rounding down a value to the nearest whole number. When the representation bit number $N_w$ is provided, a quantization level $q_w$ is defined as $2^{N_w-1}-1$.

Referring to FIG. 11A, a forwarding process of weight quantization in an example in which $N_w$ is "3" is illustrated. A function $\overline{W}$ indicated with broken lines is calculated from a weight w, a range-clipped function $\overline{W}_c$ is calculated from $\overline{W}$, and a quantized weight $\hat{W}$ is calculated from $\overline{W}_c$.

First, when an interval (a, b) is determined, $\overline{W}$ is calculated by examples Equation 5, example Equation 6, and example Equation 7 below. Here, a denotes the fourth threshold, and b denotes the third threshold.

$$\alpha = \frac{b}{b-a}\left(1 - \frac{1}{q_s}\right) \qquad \text{Equation 5}$$

Equation 5 expresses a slope of $\overline{W}$.

$$\beta = \frac{b}{b-a}\left(\frac{b}{q_s} - a\right) \qquad \text{Equation 6}$$

Equation 6 expresses the y-intercept of $\overline{W}$.

$$\overline{W} = \text{sign } W \cdot \max(\alpha|W| + \beta, 0) \qquad \text{Equation 7}$$

The function $\overline{W}$ is calculated by Equation 3.

$$\overline{W}_c = \text{Clipping}\left(-b - \frac{b}{2q_s}, b + \frac{b}{2q_s}\right) \qquad \text{Equation 8}$$

$\overline{W}_c$ denotes a function to clip $\overline{W}$ with an interval $$\left(-b - \frac{b}{2q_s}, b + \frac{b}{2q_s}\right).$$

$$\hat{W} = \text{sign}\overline{W}_c = \frac{\lfloor |\overline{W}_c| \cdot q_s/b \rfloor}{q_s/b}$$ Equation 9

The quantized weight $\hat{W}$ is calculated by example Equation 9. Here, $q_s$ denotes a quantization level.

Figure 11B:
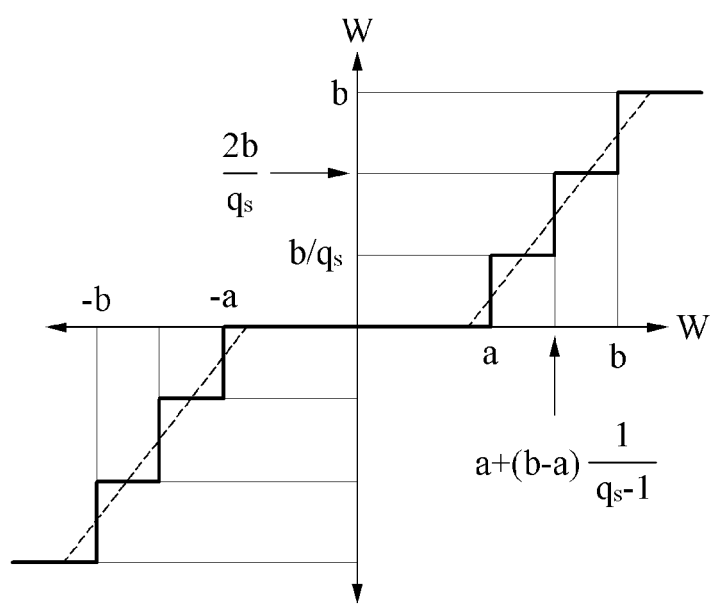
FIG. 11B illustrates an example of a backward function used for weight quantization by a neural network training apparatus, in accordance with one or more embodiments.

FIG. 11B illustrates an example of a backward function used for weight quantization by a neural network training apparatus.

Quantization blocks back-propagation of an error in a backward process or a back-propagation process. To solve such an issue, a quantization function is approximated as a piecewise linear function. Referring to FIG. 11B, a piecewise linear function $\overline{W}$ is indicated with broken lines.

A slope of the piecewise linear function $\overline{W}$ is calculated by example Equation 10 below.

$$\alpha = \frac{b}{b-a}\left(1 - \frac{1}{q_s}\right)$$ Equation 10

The y-intercept of the piecewise linear function $\overline{W}$ is calculated by example Equation 11 below.

$$\beta' = \frac{b}{b-a}\left(\frac{b}{q_s} - a\right) - \frac{b}{2q_s}$$ Equation 11

A gradient of the slope of the piecewise linear function $\overline{W}$ with respect to a is calculated by example Equation 12 below.

$$\frac{\partial \alpha}{\partial a} = \frac{1 - 1/q_s}{(b-a)^2}b$$ Equation 12

A gradient of the y-intercept of the piecewise linear function $\overline{W}$ with respect to "a" is calculated by example Equation 13 below.

$$\frac{\partial \beta'}{\partial a} = -\frac{1 - 1/q_s}{(b-a)^2}b^2$$ Equation 13

A gradient of the slope of the piecewise linear function $\overline{W}$ with respect to b is calculated by example Equation 14.

$$\frac{\partial \alpha}{\partial b} = -\frac{1 - 1/q_s}{(b-a)^2}a$$ Equation 14

A gradient of the y-intercept of the piecewise linear function $\overline{W}$ with respect to b is calculated by example Equation 15 below.

$$\frac{\partial \beta'}{\partial b} = \frac{1}{2q_s} + \frac{1}{(b-a)^2}a^2$$ Equation 15

As a result, the piecewise linear function $\overline{W}$ is expressed by example Equation 16.

$$\overline{W} = \alpha W + \beta' \cdot \text{sign } W$$ Equation 16

A gradient of the piecewise linear function $\overline{W}$ expressed by example Equation 16 with respect to a weight W is expressed by example Equation 17.

$$\frac{\partial \overline{W}}{\partial W} = \alpha.$$ Equation 17

A gradient of the piecewise linear function $\overline{W}$ with respect to a is calculated by example Equation 18.

$$\frac{\partial \overline{W}}{\partial a} = \frac{\partial \alpha}{\partial a}W + \frac{\partial \beta'}{\partial a}\text{sign}W.$$ Equation 18

A gradient of the piecewise linear function $\overline{W}$ with respect to b is calculated by example Equation 19.

$$\frac{\partial \overline{W}}{\partial b} = \frac{\partial \alpha}{\partial b}W + \frac{\partial \beta'}{\partial b}\text{sign}W$$ Equation 19

An error occurring in the quantization process is back-propagated based on the gradients calculated by example Equation 17, example Equation 18, and example Equation 19. Accordingly, the interval (a, b) may be updated.

Figure 12:
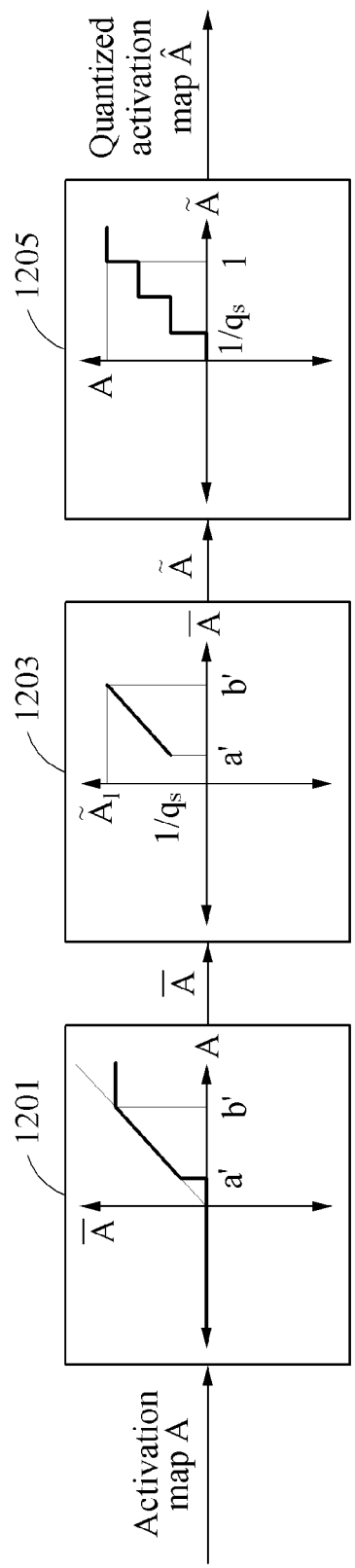
FIG. 12 illustrates an example of a function used for quantization of an activation map by a neural network training apparatus, in accordance with one or more embodiments.

FIG. 12 illustrates an example of a function used for quantization of an activation map by a neural network training apparatus.

An activation quantization parameter may include a first threshold and a second threshold of an activation map of each of a plurality of layers. Here, an upper limit of an activation map represented with a second representation bit number is referred to as the first threshold, and a lower limit of the activation map is referred to as the second threshold.

A process of quantizing the activation map is similar to a process of quantizing a weight. Referring to FIG. 12, a forwarding process of activation map quantization in an example in which $N_w$ is "2" is illustrated. As expressed by example Equation 20 below, a function $\overline{A}$ is calculated from an activation map A, a range-clipped function $\overline{A}$ is calculated from $\overline{A}$, and a quantized activation map $\hat{A}$ is calculated from $\overline{A}$.

$$A \rightarrow \overline{A}$$ Equation 20

When an interval (a', b') is determined, the range-clipped function $\tilde{A}$ is calculated from $\overline{A}$ as expressed by example Equation 21 below. Here, a' denotes the second threshold, and b' denotes the first threshold.

$$\tilde{A} = \left(\frac{A - \beta'}{\alpha'}\right)$$ Equation 21

The quantized activation map $\hat{A}$ is calculated from $\overline{A}$ as expressed by example Equation 22 below.

$$\hat{A} = \left(\alpha' \frac{\lfloor \tilde{A} \cdot q_s \rfloor}{q_s} + \beta'\right)$$ Equation 22

An error back-propagation process by quantization of the activation map is performed similarly to a weight back-propagation process. Accordingly, the interval (a', b') may be updated.

Figure 13A:
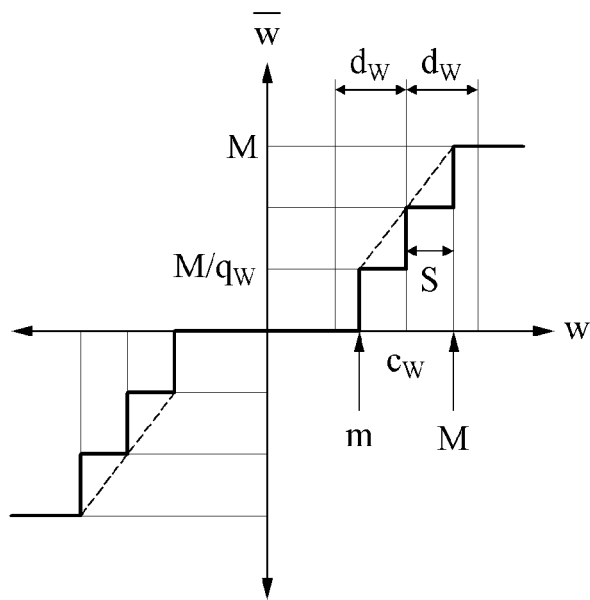
FIG. 13A illustrates an example of a forwarding function used for weight quantization by a neural network training apparatus, in accordance with one or more embodiments.

FIG. 13A illustrates an example of a forwarding function used for weight quantization by a neural network training apparatus.

A distribution state of a weight is expressed by a median value and a half of a difference between a maximum value and a minimum value, instead of an upper limit and a lower limit. Here, a median value of an absolute value of a weight represented with a first representation bit number is referred to as a first median value, and a half of a difference between a maximum value and a minimum value of the absolute value of the weight is referred to as a first difference value. A weight quantization parameter includes a first median value and a first difference value of an activation map of a first layer.

A quantized weight $\overline{w}$ is calculated from $\hat{w}_F$, and $\hat{w}_F$ is calculated from w. First, $\hat{w}_F$ is calculated from W as expressed by example Equation 23 below. Referring to FIG. 13A, $\hat{w}_F$ in an example in which $N_w$ is "3" is indicated with broken lines.

$$\hat{w}_F = \begin{cases} 0 & |w| < m \\ M \cdot \text{sign}(w) & |w| \geq M \\ \alpha w + \beta' \cdot \text{sign}(w) & m \leq |w| \leq M \end{cases} \quad \text{Equation 23}$$

Positive values of the weight have a positive interval $(c_w-d_w, c_w+d_w)$. Here, $c_w$ denotes the first median value, and $d_w$ denotes the first difference value. The weight greater than "0" is quantized uniformly at a level of $q_w$ within the positive interval $(c_w-d_w, c_w+d_w)$. The weight less than "0" is quantized uniformly at the level of $q_w$ within a negative interval $(-c_w-d_w, -c_w+d_w)$. Here, m denotes a lower limit of an interval with respect to the weight, and M denotes an upper limit of the interval with respect to the weight.

$$m = c_W - d_W + d_W/q_W$$

$$M = c_W + d_W - d_W/q_W$$

$$\alpha = M/2d_W = c_W/2d_W + (1-1/q_W)/2$$

$$\beta' = M - M^2/2d_W = -c_W^2/2d_W + c_W/q_W + d_W(1-1/q_W^2)/2 \quad \text{Equation 24}$$

m, M, $\alpha$, and $\beta'$ of Equation 23 are defined as expressed by Equation 24. Here, $\alpha$ denotes a slope of $\hat{w}_F$. The quantized weight is calculated as expressed by example Equation 25.

$$\overline{w} = \frac{\lfloor (|\hat{w}_F|/M) \cdot q_W \rfloor}{q_W} \cdot M \cdot \text{sign}(w) \quad \text{Equation 25}$$

Figure 13B:
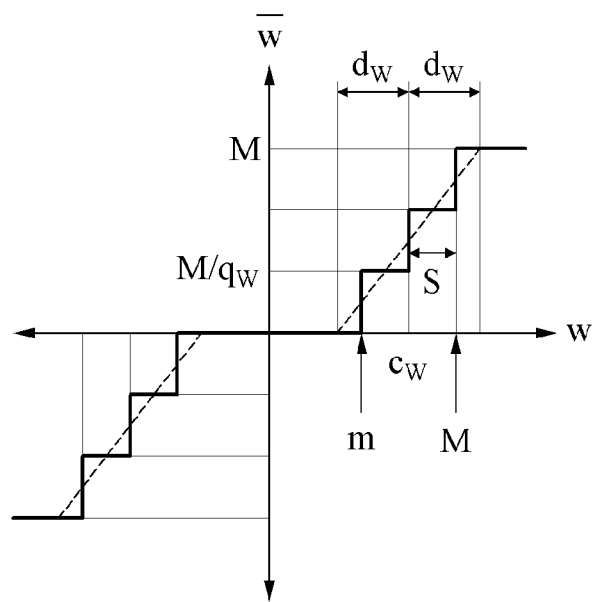
FIG. 13B illustrates an example of a backward function used for weight quantization by a neural network training apparatus, in accordance with one or more embodiments.

FIG. 13B illustrates an example of a backward function used for weight quantization by a neural network training apparatus.

Referring to FIG. 13B, a piecewise linear function $\hat{w}$ in an example in which $N_w$ is "3" is indicated with broken lines. The piecewise linear function $\hat{w}$ is defined as expressed by example Equation 26.

$$\hat{w} = \begin{cases} 0 & |w| < c_W - d_W \\ M \cdot \text{sign}(w) & |w| \geq c_W + d_W \\ \alpha w + \beta \cdot \text{sign}(w) & c_W - d_W \leq |w| \leq c_W + d_W \end{cases} \quad \text{Equation 26}$$

Gradients of the piecewise linear function $\hat{w}$ with respect to w, $c_w$, and $d_w$ are calculated by example Equation 27, example Equation 28, and example Equation 29, respectively.

$$\frac{\partial \hat{w}}{\partial w} = \begin{cases} 0 & |w| < c_W - d_W \text{ or } |w| > c_W + d_W \\ \alpha & c_W - d_W \leq |w| \leq c_W + d_W \end{cases} \quad \text{Equation 27}$$

$$\frac{\partial \hat{w}}{\partial c_W} = \begin{cases} 0 & |w| < c_W - d_W \\ \frac{\partial M}{\partial c_W} \cdot \text{sign}(w) & |w| > c_W + d_W \\ \frac{\partial \alpha}{\partial c_W} w + \frac{\partial \beta}{\partial c_W} \cdot \text{sign}(w) & c_W - d_W \leq |w| \leq c_W + d_W \end{cases} \quad \text{Equation 28}$$

$$\frac{\partial \hat{w}}{\partial d_W} = \begin{cases} 0 & |w| < c_W - d_W \\ \frac{\partial M}{\partial d_W} \cdot \text{sign}(w) & |w| > c_W + d_W \\ \frac{\partial \alpha}{\partial d_W} w + \frac{\partial \beta}{\partial d_W} \cdot \text{sign}(w) & c_W - d_W \leq |w| \leq c_W + d_W \end{cases} \quad \text{Equation 29}$$

Figure 14:
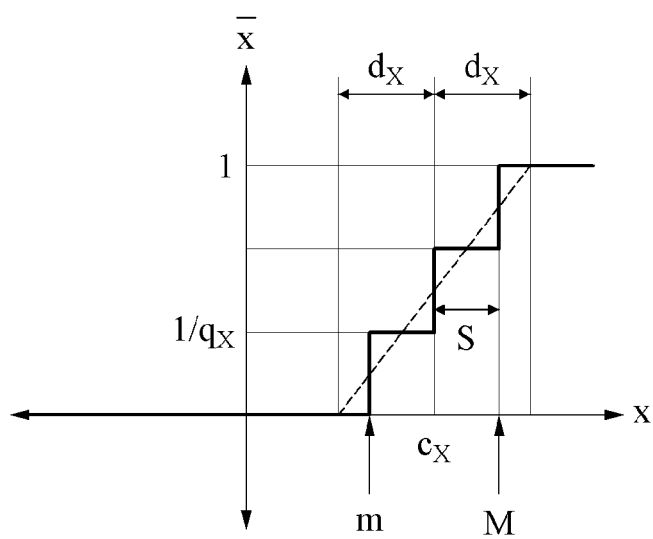
FIG. 14 illustrates an example of a backward function used for quantization of an activation map by a neural network training apparatus, in accordance with one or more embodiments.

FIG. 14 illustrates an example of a backward function used for quantization of an activation map by a neural network training apparatus.

A distribution state of an activation map is expressed by a median value and a half of a difference between an upper limit and a lower limit, instead of the upper limit and the lower limit. Here, a median value of an activation map represented with a second representation bit number is referred to as a first median value, and a half of a difference between an upper limit and a lower limit of an absolute value of the activation map is referred to as a first difference value. An activation quantization parameter includes a first median value and a first difference value of an absolute value of a weight of a second layer.

An activation map is quantized through a process similar to that for a weight. However, the activation map is an output of a ReLu function and thus, has only a positive value. $c_x$, and $d_x$ with respect to the activation map are determined for each layer. Here, $c_x$ denotes the first median value, and $d_x$ denotes the second difference value. A forwarding process of the activation map is the same as a forwarding process of the weight, and thus further description is omitted for conciseness.

Referring to FIG. 14, a backward process of the activation map in an example in which $N_w$ is "2" is illustrated. For back-propagation of an error of a quantized activation map, an approximation function $\hat{x}$ is defined as expressed by Equation 30. The approximation function $\hat{x}$ corresponds to a broken line of FIG. 14.

$$\hat{x} = \begin{cases} 0 & x < m \\ 1 & x \geq M \\ \alpha x + \beta & m \leq x \leq M \end{cases} \quad \text{Equation 30}$$

In example Equation 30, m, M, $\alpha$, and $\beta$ are defined as expressed by example Equation 31. In example Equation 31, m denotes a lower limit of an interval with respect to the activation map, and M denotes an upper limit of the interval with respect to the activation map.

$$m = c_X - d_X + d_X/q_X$$

$$M = c_X + d_X - d_X/q_X$$

$$\alpha = 0.5/d_X$$

$$\beta = -0.5 c_X/d_X + 0.5 \quad \text{Equation 31}$$

Gradients of x, $c_x$, and $d_x$ with respect to $\hat{x}$ are calculated as expressed by example Equation 32, example Equation 33, and example Equation 34 below, respectively.

$$\frac{\partial \hat{x}}{\partial x} = \begin{cases} 0 & x < m \text{ or } x \geq M \\ 0.5/d_X & m \leq x \leq M \end{cases} \quad \text{Equation 32}$$

The gradient of x with respect to $\hat{x}$ is calculated by example Equation 32.

$$\frac{\partial \hat{x}}{\partial c_X} = \begin{cases} 0 & x < m \text{ or } x \geq M \\ -0.5/d_X & m \leq x \leq M \end{cases} \quad \text{Equation 33}$$

The gradient of $c_x$ with respect to $\hat{x}$ is calculated by example Equation 33.

$$\frac{\partial \hat{x}}{\partial d_X} = \begin{cases} 0 & x < m \text{ or } x \geq M \\ -0.5x/d_X^2 + 0.5 c_X/d_X^2 & m \leq x \leq M \end{cases} \quad \text{Equation 34}$$

The gradient of $d_x$ with respect to $\hat{x}$ is calculated by example Equation 34.

Figure 15:
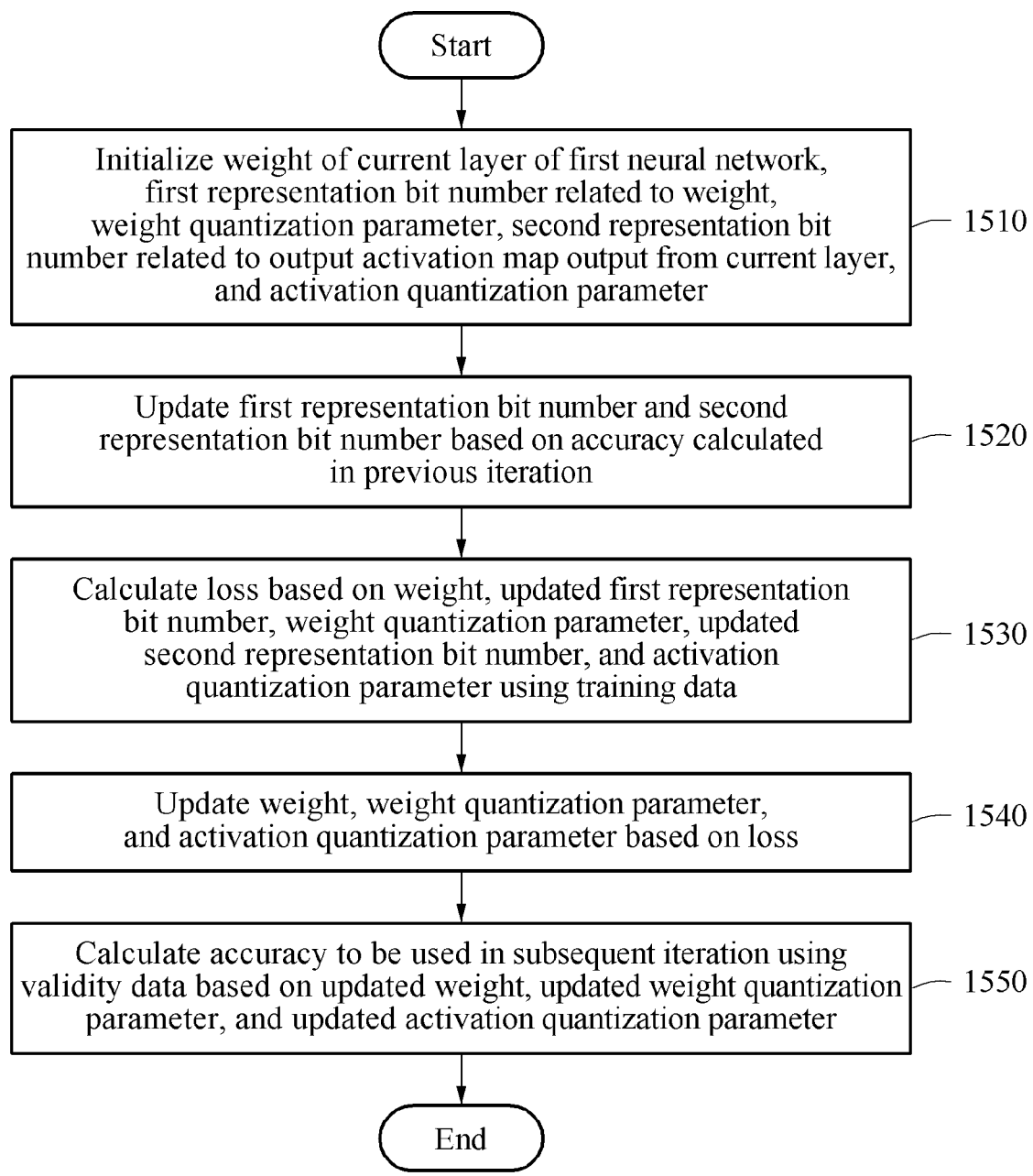
FIG. 15 illustrates an example of operations of a neural network training method, in accordance with one or more embodiments.

FIG. 15 illustrates an example of operations of a neural network training method. The operations in FIG. 15 may be performed in the sequence and manner as shown, although the order of some operations may be changed or some of the operations omitted without departing from the spirit and scope of the illustrative examples described. Many of the operations shown in FIG. 15 may be performed in parallel or concurrently. One or more blocks of FIG. 15, and combinations of the blocks, can be implemented by special purpose hardware-based computer that perform the specified functions, or combinations of special purpose hardware and computer instructions. In addition to the description of FIG. 15 below, the descriptions of FIGS. 1-14 are also applicable to FIG. 15, and are incorporated herein by reference. Thus, the above description may not be repeated here.

A neural network training apparatus optimizes training of representation bit numbers, a weight quantization parameter, an activation quantization parameter, and a weight in a step by step manner. The neural network training apparatus performs training of the representation bit numbers, and then trains the weight quantization parameter, the activation quantization parameter, and the weight.

Referring to FIG. 15, in operation 1510, the neural network training apparatus initializes a first representation bit number of a weight of each of a plurality of layers of a first neural network, including a plurality of layers configured to output activation maps, a second representation bit number of an activation map of each of the plurality of layers, a weight quantization parameter of a weight of each of the plurality of layers, and an activation quantization parameter of the activation map of each of the plurality of layers.

In operation 1520, the neural network training apparatus updates the first representation bit number and the second representation bit number based on an accuracy calculated in a previous iteration.

In operation 1530, the neural network training apparatus calculates a loss based on the weight, the updated first representation bit number, the weight quantization parameter, the updated second representation bit number, and the activation quantization parameter based on training data.

In operation 1540, the neural network training apparatus updates the weight, the weight quantization parameter, and the activation quantization parameter based on the loss. If the loss is less than a previously calculated loss, the neural network training apparatus updates the weight quantization parameter and the activation quantization parameter. The neural network training apparatus trains the neural network so as to decrease the loss.

In operation 1550, the neural network training apparatus calculates an accuracy to be used in a subsequent iteration based on validity data with respect to the updated weight, the updated weight quantization parameter, and the updated activation quantization parameter. By repeating the above process, the representation bit numbers, the weight, and the quantization parameters may be optimized.

Figure 16:
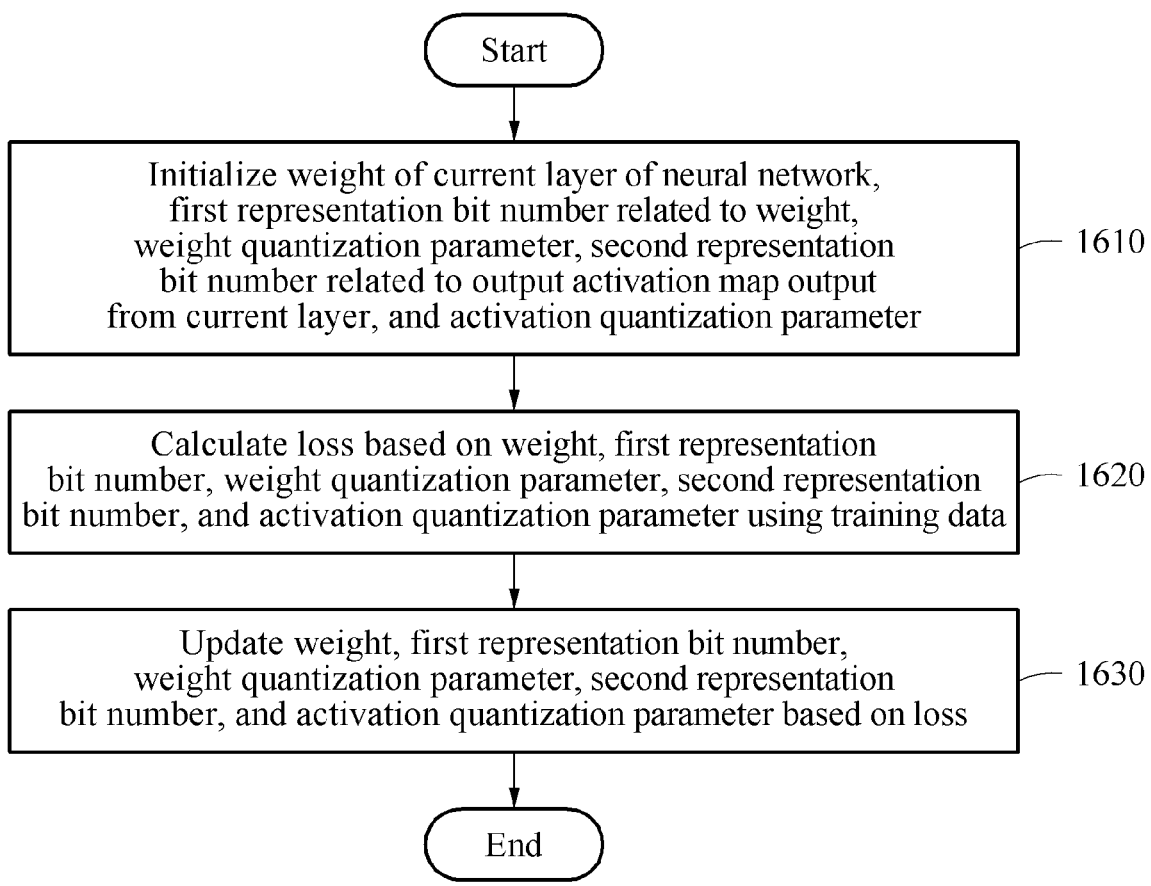
FIG. 16 illustrates an example of operations of a neural network training method, in accordance with one or more embodiments.

FIG. 16 illustrates an example of operations of a neural network training method. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. One or more blocks of FIG. 16, and combinations of the blocks, can be implemented by special purpose hardware-based computer that perform the specified functions, or combinations of special purpose hardware and computer instructions. In addition to the description of FIG. 16 below, the descriptions of FIGS. 1-15 are also applicable to FIG. 16, and are incorporated herein by reference. Thus, the above description may not be repeated here.

A neural network training apparatus matches training of representation bit numbers to training of quantization parameters. The neural network training apparatus trains the representation bit numbers and the quantization parameters together. The neural network training apparatus trains the representation bit numbers and the quantization parameters together during a single training iteration.

Referring to FIG. 16, in operation 1610, the neural network training apparatus initializes a weight of a current layer of a neural network, a first representation bit number related to the weight, a weight quantization parameter, a second representation bit number related to an output activation map output from the current layer, and an activation quantization parameter.

In operation 1620, the neural network training apparatus calculates a loss based on the weight, the first representation bit number, the weight quantization parameter, the second representation bit number, and the activation quantization parameter based on training data. The neural network training apparatus calculates an accuracy with the training data based on the first representation bit number, the second representation bit number, the weight quantization parameter, and the activation quantization parameter, and calculates the loss based on the accuracy, the first representation bit number, and the second representation bit number. Here, the loss reflects the accuracy and a performance. The performance refers to an index indicating a computing speed or a performance associated with a required memory.

In operation 1630, the neural network training apparatus updates the weight, the first representation bit number, the weight quantization parameter, the second representation bit number, and the activation quantization parameter based on the loss. If the loss or the accuracy does not satisfy a condition, the above process is iterated.

Figure 17:
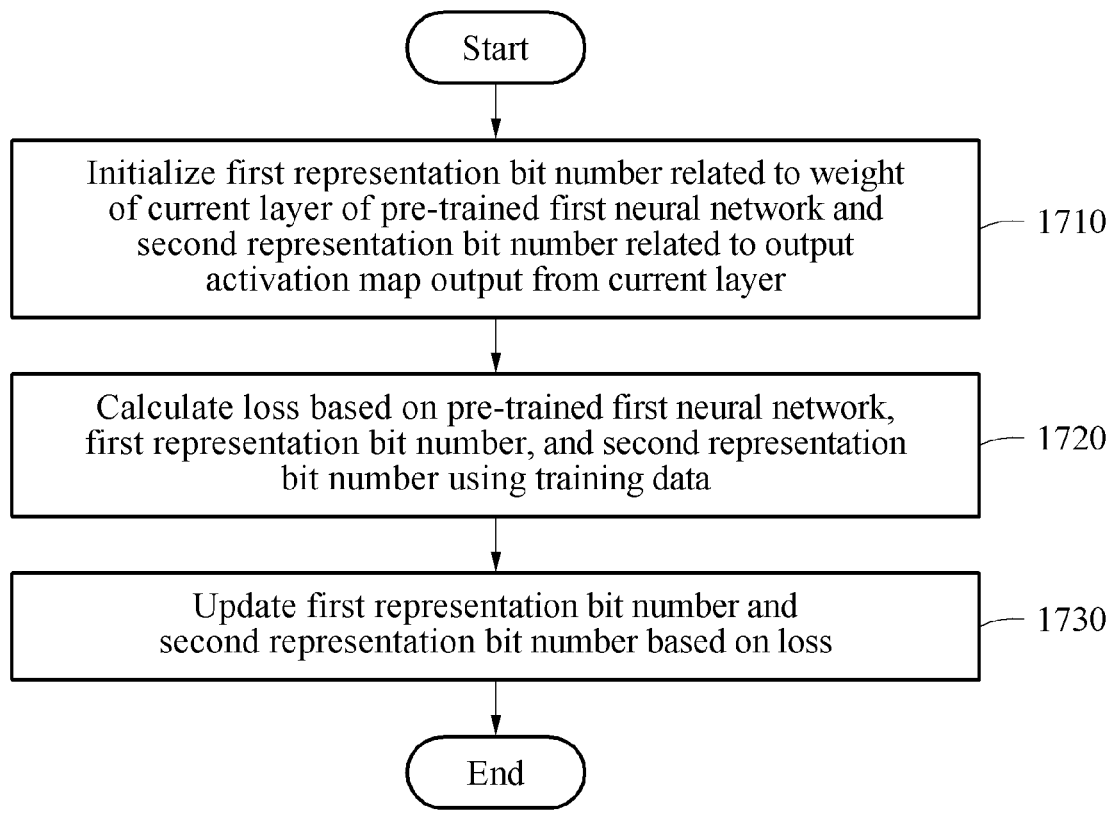
FIG. 17 illustrates an example of operations of a neural network training method, in accordance with one or more embodiments.

FIG. 17 illustrates an example of operations of a neural network training method. The operations in FIG. 17 may be performed in the sequence and manner as shown, although the order of some operations may be changed or some of the operations omitted without departing from the spirit and scope of the illustrative examples described. Many of the operations shown in FIG. 17 may be performed in parallel or concurrently. One or more blocks of FIG. 17, and combinations of the blocks, can be implemented by special purpose hardware-based computer that perform the specified functions, or combinations of special purpose hardware and computer instructions. In addition to the description of FIG. 17 below, the descriptions of FIGS. 1-16 are also applicable to FIG. 17, and are incorporated herein by reference. Thus, the above description may not be repeated here.

A neural network training apparatus trains a first representation bit number and a second representation bit number while fixing quantization parameters.

Referring to FIG. 17, in operation 1710, the neural network training apparatus initializes a first representation bit number related to a weight of a current layer of a pre-trained first neural network and a second representation bit number related to an output activation map output from the current layer. For example, a pre-trained neural network may initially be generated by initializing parameters of the neural network 2000 (FIG. 20), and then the parameters of the neural network 2000 may be repetitively adjusted based on respective loss function considerations until the neural network 2000 is trained.

In operation 1720, the neural network training apparatus calculates a loss based on the pre-trained first neural network, the first representation bit number, and the second representation bit number based on training data.

In operation 1730, the neural network training apparatus updates the first representation bit number and the second representation bit number based on the loss.

Figure 18:
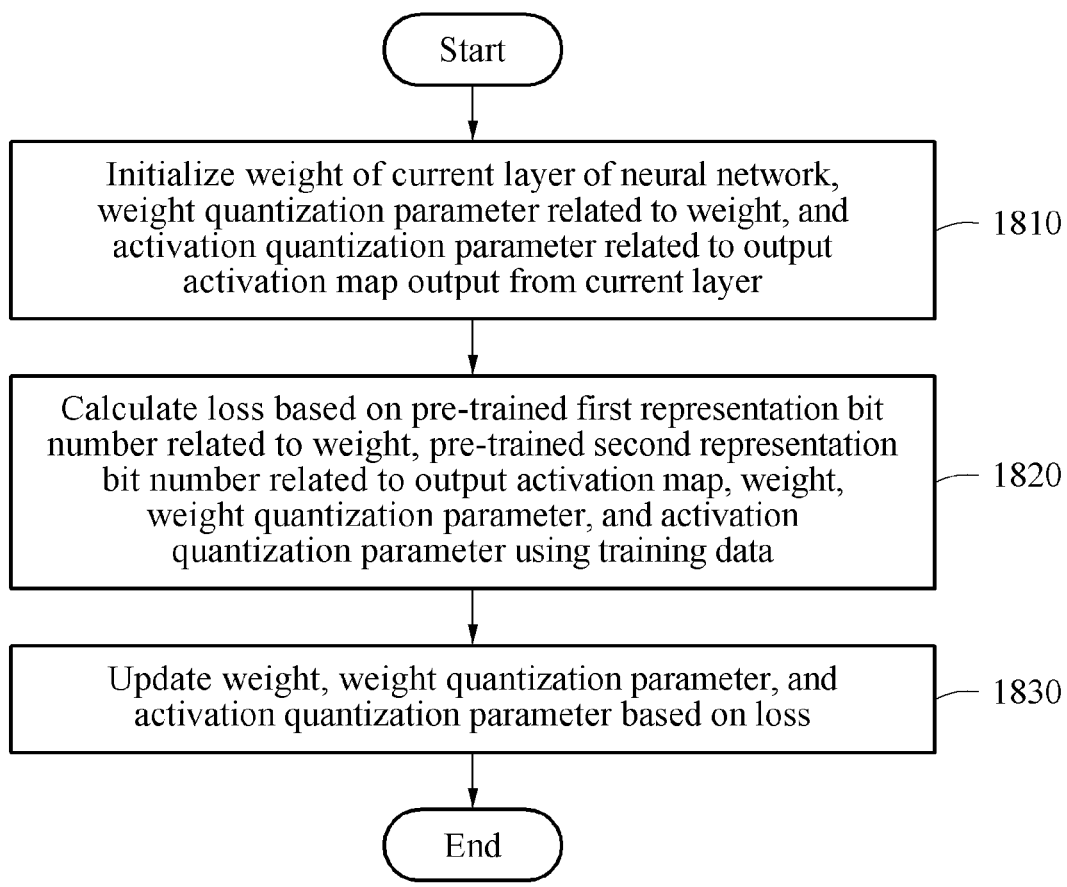
FIG. 18 illustrates an example of operations of a neural network training method, in accordance with one or more embodiments.

FIG. 18 illustrates an example of operations of a neural network training method. The operations in FIG. 18 may be performed in the sequence and manner as shown, although the order of some operations may be changed or some of the operations omitted without departing from the spirit and scope of the illustrative examples described. Many of the operations shown in FIG. 18 may be performed in parallel or concurrently. One or more blocks of FIG. 18, and combinations of the blocks, can be implemented by special purpose hardware-based computer that perform the specified functions, or combinations of special purpose hardware and computer instructions. In addition to the description of FIG. 18 below, the descriptions of FIGS. 1-17 are also applicable to FIG. 18, and are incorporated herein by reference. Thus, the above description may not be repeated here.

A neural network training apparatus trains a weight quantization parameter, an activation quantization parameter, and a weight while fixing representation bit numbers.

Referring to FIG. 18, in operation 1810, the neural network training apparatus initializes a weight of a current layer of a neural network, a weight quantization parameter related to the weight, and an activation quantization parameter related to an output activation map output from the current layer.

In operation 1820, the neural network training apparatus calculates a loss based on a pre-trained first representation bit number related to the weight, a pre-trained second representation bit number related to the output activation map, the weight, the weight quantization parameter, and the activation quantization parameter based on training data.

In operation 1830, the neural network training apparatus updates the weight, the weight quantization parameter, and the activation quantization parameter based on the loss.

Figure 19:
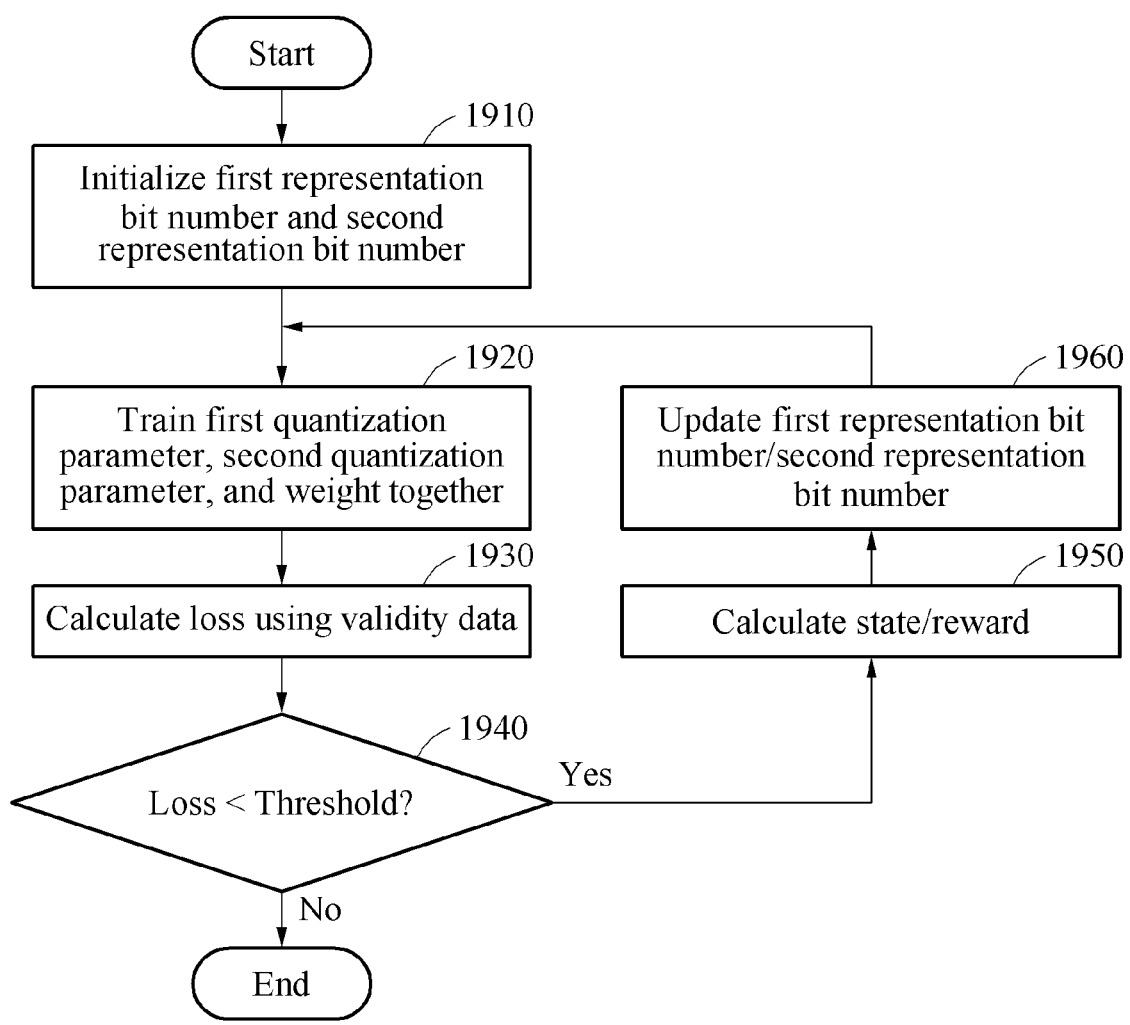
FIG. 19 illustrates an example of an algorithm of a neural network training method.

FIG. 19 illustrates an example of an algorithm of a neural network training method. The operations in FIG. 19 may be performed in the sequence and manner as shown, although the order of some operations may be changed or some of the operations omitted without departing from the spirit and scope of the illustrative examples described. Many of the operations shown in FIG. 19 may be performed in parallel or concurrently. One or more blocks of FIG. 19, and combinations of the blocks, can be implemented by special purpose hardware-based computer that perform the specified functions, or combinations of special purpose hardware and computer instructions. In addition to the description of FIG. 19 below, the descriptions of FIGS. 1-18 are also applicable to FIG. 19, and are incorporated herein by reference. Thus, the above description may not be repeated here.

Referring to FIG. 19, a neural network training apparatus trains a neural network based on a reinforcement learning algorithm of training representation bit numbers and quantization parameters step by step.

Referring to FIG. 19, in operation 1910, the neural network training apparatus initializes a first representation bit number and a second representation bit number. For example, the first representation bit number and the second representation bit number are initialized identically for each layer of the neural network. For example, the first representation bit number and the second representation bit number are initialized to "8". However, examples are not limited thereto. The first representation bit number and the second representation bit number may be initialized to a predetermined representation bit number which is less than an initial high-bit representation bit number corresponding to a full-precision value.

In operation 1920, the neural network training apparatus trains a weight quantization parameter, an activation quantization parameter, and a weight together. The neural network training apparatus outputs an activation map by inputting training data into a first layer. A convolution operation is performed with respect to the training data and a quantized weight of the first layer. An output activation map is quantized based on the second representation bit number and the activation quantization parameter.

In operation 1930, the neural network training apparatus calculates a loss based on validity data. In operation 1940, the neural network training apparatus determines whether the loss is less than a threshold.

In response to a determination that the loss is less than the threshold, the neural network training apparatus calculates a state and a reward of the neural network, in operation 1950. The state includes a quantization error of each of the weight quantization parameter and the activation quantization parameter, a distribution of a weight of each of a plurality of layers, and a distribution of an activation map, and the reward includes the loss.

In operation 1960, the neural network training apparatus updates the first representation bit number and the second representation bit number. The neural network training apparatus updates the first representation bit number and the second representation bit number based on the state and the reward. For example, the neural network training apparatus optimizes the first representation bit number and the second representation bit number so as to decrease the loss included in the reward.

In response to a determination that the loss is greater than or equal to the threshold in operation 1940, the neural network training apparatus terminates training of the neural network. The neural network quantizes the weight for each layer based on the first representation bit number and the weight quantization parameter with respect to each layer. The neural network stores the quantized weight, the second representation bit number, and the activation quantization parameter as parameters.

Figure 20:
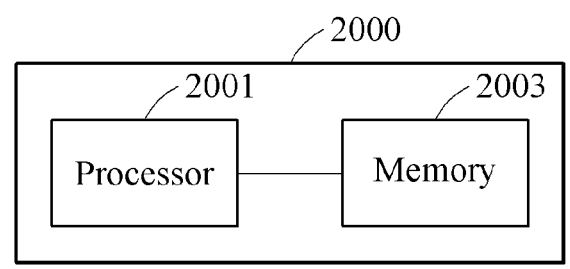
FIG. 20 illustrates an example of an overall configuration of a neural network training apparatus, in accordance with one or more embodiments.

FIG. 20 illustrates an example of an overall configuration of a neural network training apparatus.

A neural network training apparatus 2000 includes at least one processor 2001, and at least one memory 2003 configured to store instructions to be executed by the processor 2001 and a first neural network including a plurality of layers configured to output activation maps. The bit determiner 510 and the neural network trainer 520 of FIG. 5 are implemented with the processor 2001 or the memory 2003. For example, the bit determiner 510 and the neural network trainer 520 of FIG. 5 may be established by a general-purpose processor 2001 and a storage space assigned to a single memory 2003. In another example, the bit determiner 510 and the neural network trainer 520 of FIG. 5 may be assigned with respective processors. The bit determiner 510 and the neural network trainer 520 are each established as hardware by a type of processor 2001, for example, a field programmable gate array (FPGA).

The processor 2001 initializes a first representation bit number of a weight of each of the plurality of layers of the first neural network, a second representation bit number of an activation map of each of the plurality of layers, a weight quantization parameter of the weight of each of the plurality of layers, and an activation quantization parameter of the activation map of each of the plurality of layers based on the instructions.

The processor 2001 trains the first representation bit number and the second representation bit number with first training data. The processor 2001 trains the weight quantization parameter and the activation quantization parameter with second training data based on the trained first representation bit number and the trained second representation bit number.

The processor 2001 trains the first representation bit number, the second representation bit number, the weight quantization parameter, and the activation quantization parameter concurrently with training data.

Figure 21:
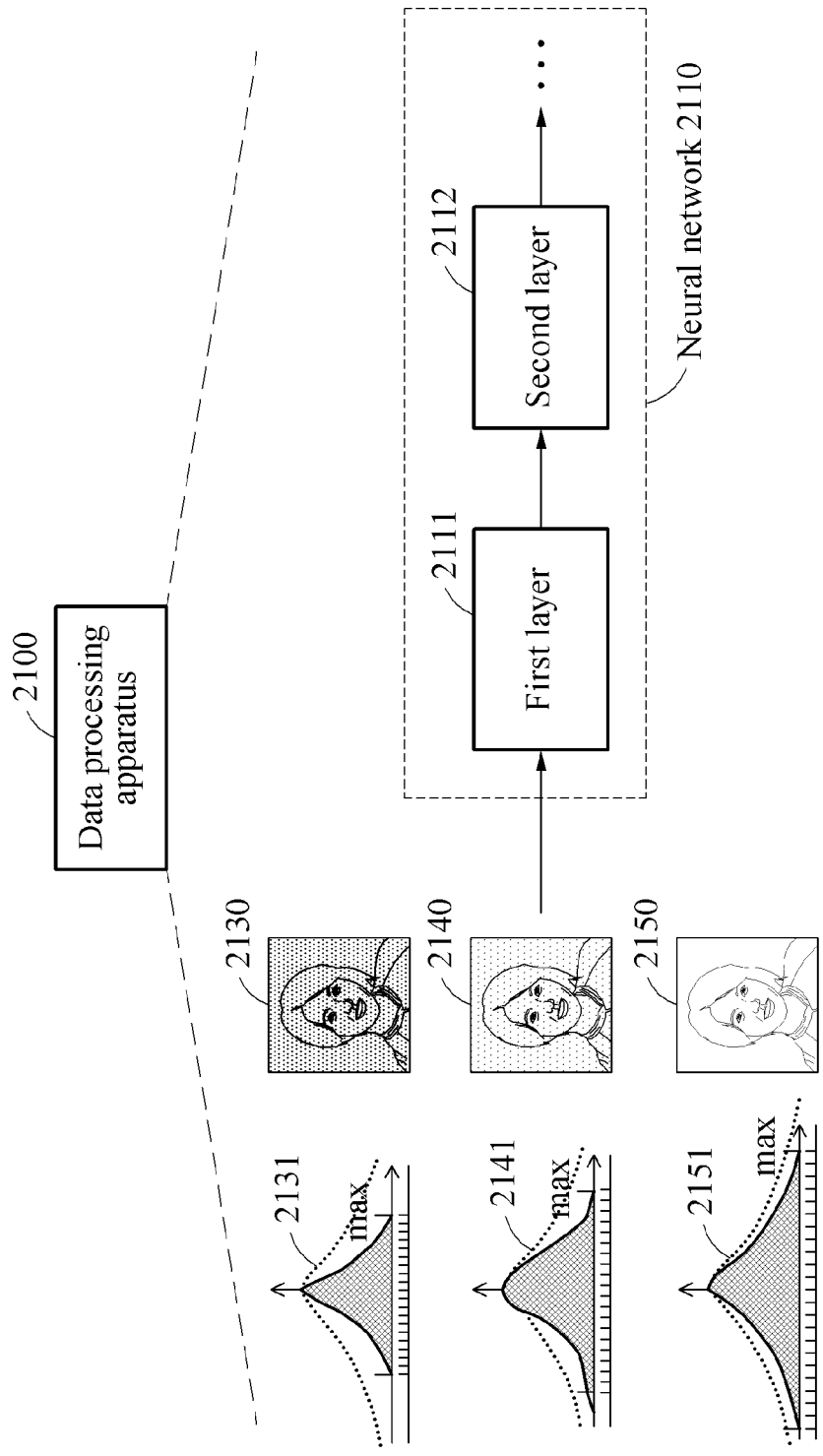
FIG. 21 illustrates an example of a data processing apparatus, in accordance with one or more embodiments.

FIG. 21 illustrates an example of a data processing apparatus.

Referring to FIG. 21, a data processing apparatus 2100 lightens and expresses data for a neural network 2110 to a low-bit width and processes an operation of the neural network 2110 based on the lightened data. For example, the operation of the neural network 2110 includes recognizing or authenticating an object in an input image. The operation of the neural network 2110 includes performing a speech recognition from input data. The operation of the neural network 2110 includes performing autonomous driving or robot control based on input data. However, examples are not limited thereto. The data processing apparatus 2100 may be used in various fields in which a neural network is used.

The neural network 2110 includes a plurality of layers. The plurality of layers includes an input layer, at least one hidden layer, and an output layer. A first layer 2111 and a second layer 2112 are at least a portion of the plurality of layers. Although FIG. 21 illustrates the two layers 2111 and 2112 for ease of description, the neural network 2110 may include more layers in addition to the two layers 2111 and 2112.

In FIG. 21, a graph 2131 shows a data distribution of pixel values of an input image 2130, a graph 2141 shows a data distribution of pixel values of an input image 2140, and a graph 2151 shows a data distribution of pixel values of an input image 2150. The input image 2130 includes data of relatively small values, and the input image 2150 includes data of relatively great values. The data processing apparatus 2100 adaptively sets different lightening formats respectively for the input images 2130 through 2150 when processing the input images 2130 through 2150 separately with the neural network 2110. For example, the data processing apparatus 2100 applies a relatively high lightening format to a dataset of relatively small values like the input image 2130 and applies a relatively low lightening format to a dataset of relatively great values like the input image 2150.

According to the examples, recognition and authentication technology is implemented effectively by maximizing a processing rate or a memory utilization in a limited embedded environment of such as a smart phone. According to the examples, autonomous driving or robot control technology is implemented effectively by maximizing a processing rate or a memory utilization in a limited computing environment of such as a vehicle or a robot. According to the examples, a deep neural network is expedited while minimizing a performance degradation of the deep neural network and utilized to design a structure of an effective hardware accelerator.

The data processing apparatuses 100, 200 and 2100, the neural network training apparatus 2000, are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-21 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented data processing method in a neural network, the data processing method comprising:
   performing an inference operation by implementing a current convolutional layer, of the neural network, provided an input activation map to generate an output activation map, where a kernel weight of the current convolutional layer is a weight quantized to a first representation bit number from a trained kernel weight for the current convolutional layer; and
   outputting another activation map that includes activations that are activation results, of the current convolutional layer, quantized to a second representation bit number within a range represented by an activation quantization parameter that includes a first and second parameters,
   wherein the first parameter is dependent on first and second thresholds derived from the output activation map, and the second parameter is dependent on the first and second thresholds, and
   wherein the quantization of the activation map is dependent on the first parameter and the second parameter.

2. The method of claim 1,
   wherein the first threshold indicates an upper limit of an activation map section with respect to the output activation map, and the second threshold indicates a lower limit of the activation map section.

3. The method of claim 1, wherein the first and second ammeters are respectively a first median value and a first difference value with respect to the output activation map, wherein the first difference value indicates a half of a difference between the first threshold and the second threshold, and the first median value indicates a middle value of the first threshold and the second threshold, wherein the first threshold indicates an upper limit of an activation map section with respect to the output activation map, and the second threshold indicates a lower limit of the activation map section.

4. The method of claim 1, wherein the implementing of the current convolutional layer includes performing a multiplication operation and an accumulation operation, or performing a bit-wise operation with respect to the input activation map and the kernel weight.

5. The method of claim 1, wherein the first representation bit number and the second representation bit number are equal.

6. A non-transitory computer-readable storage medium storing instructions that, when executed by a processor, cause the processor to perform the data processing method of claim 1.

7. A processor-implemented method of training a neural network, the method comprising:
  initializing a weight of a current layer of an interim neural network, a first representation bit number related to the weight, a weight quantization parameter, a second representation bit number related to an output activation map output from the current layer, and an activation quantization parameter; and
  generating a trained neural network by iteratively training plural layers of the interim neural network, including:
    calculating a loss based on the weight as a calculated loss, the first representation bit number, the weight quantization parameter, the second representation bit number, and the activation quantization parameter, with training data; and
    training the interim neural network by updating the weight, the first representation bit number, the weight quantization parameter, the second representation bit number, and the activation quantization parameter based on the calculated loss,
  wherein a first parameter is dependent on first and second thresholds derived from the output activation map, and a second parameter is dependent on the first and second thresholds, and
  wherein the calculating of the loss incudes a quantizing the activation quantization parameter dependent on the first parameter and the second parameter.

8. The method of claim 7, wherein the calculating of the loss comprises:
  quantizing the weight based on the first representation bit number and the weight quantization parameter as a quantized weight;
  outputting the output activation map by performing a convolution operation with respect to the quantized weight and an input activation map input into the current layer;
  quantizing the output activation map with the second representation bit number and the activation quantization parameter as a quantized activation map; and
  calculating the loss based on the quantized activation map.

9. The method of claim 8, wherein the activation quantization parameter includes the first threshold and the second threshold related to the output activation map, and
  the weight quantization parameter includes a third threshold and a fourth threshold of an absolute value of the weight,
  wherein the first threshold indicates an upper limit of an activation map section with respect to the output activation map, and the second threshold indicates a lower limit of the activation map section, and
  wherein the third threshold indicates an upper limit of a weight section with respect to the absolute value of the weight, and the fourth threshold indicates a lower limit of the weight section.

10. The method of claim 8, wherein the first and second parameters are respectively a first median value and a first difference value with respect to the output activation map, wherein the first difference value indicates a half of a difference between the first threshold and the second threshold, and the first median value indicates a middle value of the first threshold and the second threshold, wherein the first threshold indicates an upper limit of an activation map section with respect to the output activation map, and the second threshold indicates a lower limit of the activation map section, and
  wherein the weight quantization parameter includes a second median value and a second difference value of an absolute value of the weight of the current layer, wherein the second difference value indicates a half of a difference between a third threshold and a fourth threshold, and the second median value indicates a middle value of the third threshold and the fourth threshold, wherein the third threshold indicates an upper limit of a weight section with respect to the absolute value of the weight, and the fourth threshold indicates a lower limit of the weight section.

11. A processor-implemented method comprising:
  initializing a weight of a current layer of an interim neural network, a first representation bit number related to the weight, a weight quantization parameter, a second representation bit number related to an output activation map output from the current layer, and an activation quantization parameter; and
  generating a trained neural network by iteratively training plural layers of the interim neural network, including:
    training the interim neural network by updating the first representation bit number as an updated first representation bit number, and the second representation bit number as an updated second representation bit number, based on an accuracy calculated in a previous iteration of the iterative training;
    calculating a loss as a calculated loss based on the weight, the updated first representation bit number, the weight quantization parameter, the updated second representation bit number, and the activation quantization parameter, based on training data;
    training the interim neural network by updating the weight as an updated weight, the weight quantization parameter as an updated weight quantization parameter, and the activation quantization parameter as an updated activation quantization parameter based on the calculated loss; and
    calculating an accuracy to be implemented in a subsequent iteration, of the iterative training, with validity data based on the updated weight, the updated weight quantization parameter, and the updated activation quantization parameter,
  wherein a first parameter is dependent on first and second thresholds derived from the output activation map, and a second parameter that is dependent on the first and second thresholds, and
  wherein the subsequent iteration in performing quantization based on the updated activation quantization parameter that is dependent on the first parameter and the second parameter.

12. The method of claim 11, wherein the updating of the first representation bit number and the second representation bit number comprises increasing or decreasing the first representation bit number and the second representation bit number by a preset bit number based on the calculated loss.

13. The method of claim 11, wherein the updating of the first representation bit number and the second representation bit number comprises updating the first representation bit number and the second representation bit number with a second neural network based on the calculated loss.

14. The method of claim 11, wherein the updating of the first representation bit number and the second representation bit number comprises updating the first representation bit number and the second representation bit number based on a state and a reward including the accuracy calculated in the previous iteration, and
wherein the state includes a quantization error of each of the activation quantization parameter and the weight quantization parameter, a distribution of the weight, and a distribution of the output activation map, and the reward includes the accuracy.

15. The method of claim 11, wherein the activation quantization parameter includes the first threshold and the second threshold related to the output activation map, and
the weight quantization parameter includes a third threshold and a fourth threshold of an absolute value of the weight,
wherein the first threshold indicates an upper limit of an activation map section with respect to the output activation map, and the second threshold indicates a lower limit of the activation map section, and
wherein the third threshold indicates an upper limit of a weight section with respect to the absolute value of the weight, and the fourth threshold indicates a lower limit of the weight section.

16. The method of claim 11, wherein the activation quantization parameter includes a first median value and a first difference value with respect to the output activation map, wherein the first difference value indicates a half of a difference between the first threshold and the second threshold, and the first median value indicates a middle value of the first threshold and the second threshold, wherein the first threshold indicates an upper limit of an activation map section with respect to the output activation map, and the second threshold indicates a lower limit of the activation map section, and
the weight quantization parameter includes a second median value and a second difference value of an absolute value of the weight of the current layer, wherein the second difference value indicates a half of a difference between a third threshold and a fourth threshold, and the second median value indicates a middle value of the third threshold and the fourth threshold, wherein the third threshold indicates an upper limit of a weight section with respect to the absolute value of the weight, and the fourth threshold indicates a lower limit of the weight section.

17. A processor-implemented method of training a neural network, the method comprising:
initializing a first representation bit number related to a weight of a current layer of an interim first neural network, which is pre-trained, and a second representation bit number related to an output activation map output from the current layer; and
generating a trained neural network by iteratively training plural layers of the interim first neural network, including:
calculating a loss as a calculated loss based on the interim first neural network, the first representation bit number, and the second representation bit number, based on training data; and
training the interim first neural network by updating the first representation bit number and the second representation bit number based on the calculated loss,
wherein a first parameter is dependent on first and second thresholds derived from the output activation map, and a second parameter tat is dependent on the first and second thresholds, and
wherein the updating is dependent on the first parameter and the second parameter.

18. The method of claim 17, wherein the updating comprises increasing or decreasing the first representation bit number and the second representation bit number by a preset bit number based on the calculated loss.

19. The method of claim 17, wherein the updating comprises updating the first representation bit number and the second representation bit number with a second neural network based on the calculated loss.

20. A processor-implemented method of training a neural network, the method comprising:
initializing a weight of a current layer of the neural network, a weight quantization parameter related to the weight, and an activation quantization parameter related to an output activation map output from the current layer, where the neural network includes a first representation bit number and a second representation bit number that are pre-trained; and
iteratively training the neural network, including:
calculating a loss as a calculated loss based on the first representation bit number related to the weight, the second representation bit number related to the output activation map, the weight, the weight quantization parameter, and the activation quantization parameter, based on training data; and
train the neural network by updating the weight, the weight quantization parameter, and the activation quantization parameter based on the calculated loss,
wherein a first parameter is dependent on first and second thresholds derived from the output activation map, and a second parameter That is dependent on the first and second thresholds, and
wherein the calculating of the loss includes quantizing the activation quantization parameter dependent on the first parameter and the second parameter.

21. The method of claim 20, further comprising:
quantizing the weight as a quantized weight based on the updated weight quantization parameter and the pre-trained first representation bit number; and
storing the quantized weight and the activation quantization parameter.

22. A data processing apparatus, comprising:
at least one processor; and
at least one memory configured to store instructions to be executed by the at least one processor and a neural network,
wherein the at least one processor is configured to, based on the instructions:
perform an inference operation by implementing a current convolutional layer of the neural network provided an input activation map to generate an output activation map, where a kernel weight of the current convolutional layer is a weight quantized to a representation bit number from a trained kernel weight for the current convolutional layer; and output another activation map that includes activations that are activation results, of the current convolutional layer, quantized to a second representation bit number within a range represented by an activation quantization parameter that incudes first and second parameters, wherein the first parameter is dependent on first and second thresholds derived from the output activation map, and the second parameter is dependent on the first and second thresholds, and wherein the quantization of the activation results is dependent on the first parameter and the second parameter.

23. A face recognition apparatus, comprising:

at least one processor; and at least one memory configured to store instructions to be executed by the at least one processor and a neural network, wherein the at least one processor is configured to, based on the instructions:

output an input activation map from an input image comprising a facial image of a user;

perform an inference operation by implementing a current convolutional layer of the neural network provided the input activation map to generate an output activation map, where a kernel weight of the current convolutional layer is a weight quantized to a representation bit number from a trained kernel weight for the current convolutional layer;

output another activation map that includes activations that are activation results, of the current convolutional layer, quantized to a second representation bit number within a range represented by an activation quantization parameter that includes first and second parameters; and perform a user recognition process by processing the other activation map, wherein the first parameter is dependent on first and second thresholds derived from the output activation map, and the second parameter is dependent on the first and second thresholds, and wherein the quantization of the activation results is dependent on the first parameter and the second parameter.

24. A speech recognition apparatus, comprising:

at least one processor; and at least one memory configured to store instructions to be executed by the at least one processor and a neural network, wherein the at least one processor is configured to, based on the instructions:

output an input activation map from speech data representing a word;

perform an inference operation by implementing a current convolutional layer of the neural network provided the input activation map to generate an output activation map, where a kernel weight of the current convolutional layer is a weight quantized to a representation bit number from a trained kernel weight for the current convolutional layer;

output another activation map that includes activations that are activation results, of the current convolutional layer, quantized to a second representation bit number by quantizing the output activation map within a range represented by an activation quantization parameter that includes first and second parameters; and perform a word recognition process by processing the other activation map, wherein the first parameter is dependent on first and second thresholds derived from the output activation map, and the second parameter is dependent on the first and second thresholds, and wherein the quantization of the activation results is dependent on the first parameter and the second parameter.

25. An autonomous driving control apparatus, comprising:

at least one processor; and at least one memory configured to store instructions to be executed by the at least one processor and a neural network, wherein the at least one processor is configured to, based on the instructions:

output an input activation map from input data representing driving environment information of a vehicle;

perform an inference operation by implementing a current convolutional layer of the neural network provided the input activation map to generate an output activation map, where a kernel weight of the current convolutional layer is a weight quantized to a representation bit number from a trained kernel weight for the current convolutional layer;

output another activation map that includes activations that are activation results, of the current convolutional layer, quantized to a second representation bit number within a range represented by an activation quantization parameter that includes first and second parameters; and control a driving operation of the vehicle by processing the other activation map, wherein the first parameter is dependent on first and second thresholds derived from the output activation map, and the second parameter that is dependent on the first and second thresholds, and wherein the quantization of the activation results is dependent on the first parameter and the second parameter.

26. A robot control apparatus, comprising:

at least one processor; and at least one memory configured to store instructions to be executed by the at least one processor and a neural network, wherein the at least one processor is configured to, based on the instructions:

output an input activation map from input data representing environment information of a robot;

perform an inference operation by implementing a current convolutional layer of the neural network provided the input activation map to generate an output activation map, where a kernel weight of the current convolutional layer is a weight quantized to a representation bit number from a trained kernel weight for the current convolutional layer;

output another activation map that includes activations that are activation results, of the current convolutional layer, quantized to a second representation bit number within a range represented by an activation quantization parameter that includes first and second parameters; and perform a control operation of the robot by processing the other activation map, wherein the first parameter is dependent on first and second thresholds derived from the output activation map, and the second parameter that is dependent on the first and second thresholds, and wherein the quantization of the activation results is dependent on the first parameter and the second parameter.

\* \* \* \* \*